United States Patent
Kamal et al.

(10) Patent No.: US 11,407,928 B2
(45) Date of Patent: Aug. 9, 2022

(54) ORGANOPHILIC CLAY BASED DRILLING FLUIDS CONTAINING GEMINI SURFACTANT AND POLYACRYLAMIDE

(71) Applicant: KING FAHD UNIVERSITY OF PETROLEUM AND MINERALS, Dhahran (SA)

(72) Inventors: Muhammad Shahzad Kamal, Dhahran (SA); Mamdouh A. Al-Harthi, Dhahran (SA); Hafiz Mudaser Ahmad, Dhahran (SA); S. M. Shakil Hussain, Dhahran (SA); Mohamed Mahmoud, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 16/578,786

(22) Filed: Sep. 23, 2019

(65) Prior Publication Data
US 2020/0325381 A1    Oct. 15, 2020

Related U.S. Application Data

(60) Provisional application No. 62/831,377, filed on Apr. 9, 2019.

(51) Int. Cl.
*C09K 8/24* (2006.01)
(52) U.S. Cl.
CPC ...................... *C09K 8/24* (2013.01)
(58) Field of Classification Search
CPC ... C09K 8/22; C09K 8/24; C09K 8/18; C09K 8/16; C09K 8/145; C09K 8/14;
(Continued)

(56) References Cited

U.S. PATENT DOCUMENTS 5,112,603 A * 5/1992 Nadolsky ................ C01B 33/44
507/131
5,380,706 A * 1/1995 Himes ....................... C09K 8/22
507/129
(Continued)

FOREIGN PATENT DOCUMENTS

GB         2483024 B        8/2014
WO    WO 2015/191027 A1    12/2015

OTHER PUBLICATIONS

Xi et al., Modification of the surfaces of Wyoming montmorillonite by the castionic surfactants alkyl trimethyl, dialkyl dimethyl, and trialkyl methyl ammonium bromides, 2007, Science Direct, Journal of Colloid and Interface Science 305, 150-158 (Year: 2007).*

(Continued)

*Primary Examiner* — Angela M DiTrani Leff
(74) *Attorney, Agent, or Firm* — Oblon, McClelland, Maier & Neustadt, L.L.P.

(57) ABSTRACT

A drilling fluid formulation which includes an aqueous phase, and additives including an organophilic clay, a gemini surfactant, and a polyacrylamide. The organophilic clay contains an ion-exchange reaction product of a clay material (e.g. smectite) and quaternary ammonium cations. The polyacrylamide contains reacted units of an acrylamide monomer, an acrylate monomer, and a hydrophobicity modifying monomer. Rheology properties of the drilling fluid including gel strength, yield stress, and storage modulus are specified. The additives present in the drilling fluid synergistically boost its shale swelling inhibition capability.

11 Claims, 8 Drawing Sheets

(58) Field of Classification Search
CPC . C09K 8/05; C09K 8/03; C09K 8/032; C09K 8/035; C09K 8/04
See application file for complete search history.

(56) References Cited

U.S. PATENT DOCUMENTS

| | | | | |
|---|---|---|---|---|
| 7,700,702 | B2* | 4/2010 | Gaillard | C08F 220/06 |
| | | | | 526/307.7 |
| 8,222,455 | B2* | 7/2012 | Knox | A61K 8/22 |
| | | | | 507/276 |
| 2011/0071056 | A1 | 3/2011 | Saini et al. | |
| 2016/0264836 | A1* | 9/2016 | Wang | C09K 8/20 |
| 2017/0081582 | A1* | 3/2017 | Ghumare | C09K 8/74 |

OTHER PUBLICATIONS

Quaternium-18 bentonite, ChemIDplus, National Library of Medicine, retrieved Feb. 28, 2022 from https://chem.nlm.nih.gov/chemidplus/rn/68953-58-2 (Year: NA).*

Hafiz Mudaser Ahmad, et al., "Organophilic Clay-Based Drilling Fluids for Mitigation of Unconventional Shale Reservoirs Instability and Formation Damage", Journal of Energy Resources Technology, vol. 141, Issue 9, Sep. 2019, pp. 093102-1-093102-7.

Daniel Duarte, et al., "Structure of tetraalkylammonium ionic liquids in the interlayer of modified Montmorillonite", Journal of Physics: Condensed Matter, IOP Publishing, vol. 26, 2014, pp. 1-9.

\* cited by examiner

ORGANOPHILIC CLAY BASED DRILLING FLUIDS CONTAINING GEMINI SURFACTANT AND POLYACRYLAMIDE

CROSS REFERENCE TO RELATED APPLICATIONS

This application claims the benefit of priority of U.S. Provisional Application No. 62/831,377 filed Apr. 9, 2019, the entire contents of which are herein incorporated by reference.

STATEMENT OF ACKNOWLEDGEMENT

The inventors acknowledge the support provided by Department of Chemical Engineering, Center for Integrative Petroleum Research and Petroleum Engineering Department of King Fahd University of Petroleum and Minerals (KFUPM).

STATEMENT REGARDING PRIOR DISCLOSURE BY THE INVENTORS

Aspects of this technology are described in an article "Organophilic Clay-Based Drilling Fluids for Mitigation of Unconventional Shale Reservoirs Instability and Formation Damage" published in J. Energy Resour. Technol., 2019, 141(9), 093102, on Apr. 4, 2019.

BACKGROUND OF THE INVENTION

Technical Field

The present disclosure relates to a water-based drilling fluid that inhibits shale swelling. The drilling fluid contains a surfactant, a polyacrylamide, and an organophilic clay which is an ion-exchange reaction product of a smectite clay and quaternary ammonium cations.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Drilling fluids have been widely used during the exploration and extraction of oil/gas, as well as for stabilizing wellbore formations. In order to implement a time- and cost-effective drilling process, an ideal drilling fluid should demonstrate minimum fluid loss. In addition, the drilling fluid should be able to form thin impermeable filter cakes on the wall of the wellbore to stabilize reactive shale formations. High filtrate loss and thick filter cake often leads to destabilization of wellbore formations.

Drilling fluids including fracturing fluids, water-based drilling fluids, and completion fluids can interact with wellbore formations and lead to swelling of water sensitive shale formations. Many shale formations contain montmorillonite (Mt), which has a strong tendency to adsorb water molecules from the drilling fluid. The presence of interlayer cations such as $Na^+$ and $Ca^{2+}$ play an important role in shale swelling. Adsorption of water from the drilling fluid increases the interlayer spacing and causes shale swelling. The swelling magnitude of shale is mainly governed by factors including the ionic strength, abundance of interlayer cations, and water contents of the shale formation.

Inhibition of shale swelling has been a subject of interest in the past several decades. The knowledge of physical and chemical interactions of the drilling fluid with the formation is very important to prevent shale swelling and preserve the wellbore integrity. The swelling of wellbore causes various problems such as stuck pipe, wellbore collapse, and unsatisfactory performance of the drilling fluid [Briscoe, B. J., Luckham, P. F., and Ren, S., 1994, "The properties of drilling muds at high pressures and high temperatures," Phil. Trans. R. Soc. Lond. A, 348(1687), pp. 179-207; Cameron, C., 2001, "Drilling fluids design and management for extended reach drilling," SPE/IADC Middle East Drilling Technology Conference, Society of Petroleum Engineers; Omland, T., Dahl, B., Saasen, A., Taugbol, K., and Amundsen, P., 2008, "Optimized solid control provides opportunities for drilling depleted reservoirs," J Pet Technol, 60, pp. 84-86; Ahmad, H. M., Kamal, M. S., Murtaza, M., and Al-Harthi, M. A., 2017, "Improving the Drilling Fluid Properties using Nanoparticles and Water-Soluble Polymers," SPE Kingdom of Saudi Arabia Annual Technical Symposium and Exhibition, Society of Petroleum Engineers; Ahmad, H. M., Kamal, M. S., and Al-Harthi, M. A., 2018, "Effect of thermal aging and electrolyte on bentonite dispersions: Rheology and morphological properties," Journal of Molecular Liquids, 269, pp. 278-286; Ahmad, H. M., Kamal, M. S., Al-Harthi, M. A., Elkatatny, S. M., and Murtaza, M. M., 2018, "Synthesis and Experimental Investigation of Novel CNT-Polymer Nanocomposite to Enhance Borehole Stability at High Temperature Drilling Applications," SPE Kingdom of Saudi Arabia Annual Technical Symposium and Exhibition, Society of Petroleum Engineers; Magzoub, M., Mahmoud, M., Nasser, M., Hussein, I., Elkatatny, S., and Sultan, A., 2019, "Thermochemical Upgrading of Calcium Bentonite for Drilling Fluid Applications," Journal of Energy Resources Technology, 141(4), p. 042902; Adewole, J. K., and Najimu, M. O., 2018, "A Study on the Effects of Date Pit-Based Additive on the Performance of Water-Based Drilling Fluid," Journal of Energy Resources Technology, 140(5), p. 052903; and Kutlu, B., Takach, N., Ozbayoglu, E. M., Miska, S. Z., Yu, M., and Mata, C., 2017, "Drilling Fluid Density and Hydraulic Drag Reduction With Glass Bubble Additives," Journal of Energy Resources Technology, 139(4), p. 042904].

Recent efforts have been made to study the mechanism of swelling and analyze the effect of different inhibitors on the swelling of shale formation [Sherwood, J., 1994, "A model for the flow of water and ions into swelling shale," Langmuir: the ACS journal of surfaces and colloids, 10(7), pp. 2480-2486; Bailey, L., Keall, M., Audibert, A., and Lecourtier, J., 1994, "Effect of clay/polymer interactions on shale stabilization during drilling," Langmuir: the ACS journal of surfaces and colloids, 10(5), pp. 1544-1549; and Yuan, W., Li, X., Pan, Z., Connell, L. D., Li, S., and He, J., 2014, "Experimental investigation of interactions between water and a lower Silurian Chinese shale," Energy & Fuels, 28(8), pp. 4925-4933]. Despite these recent advances there is still a need to develop more efficient drilling fluid formulations with superior swelling inhibition capacity.

In view of the forgoing, one objective of the present disclosure is to provide a drilling fluid formulation containing an aqueous base fluid, and additives including a gemini surfactant, a polyacrylamide, and an organophilic clay. The drilling fluid demonstrates effective shale swelling inhibition as well as improved rheology properties at elevated temperatures and pressures.

BRIEF SUMMARY OF THE INVENTION

According to a first aspect, the present disclosure relates to a drilling fluid, which contains (i) an aqueous base fluid, (ii) 0.01-2 wt % of a surfactant of formula (I)

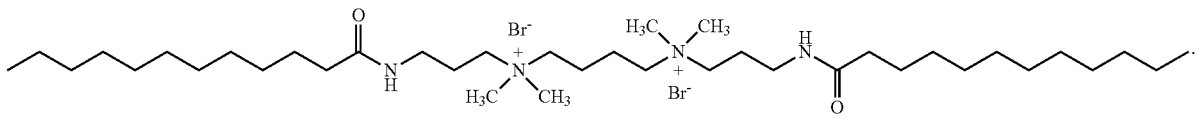

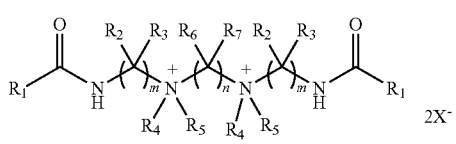

or a tautomer thereof, a stereoisomer thereof, or a mixture thereof, (iii) 0.01-2 wt % of a polyacrylamide with a weight average molecular weight ranging from 320,000 g/mol to 40,000,000 g/mol, and (iv) 0.5-15 wt % of an organophilic clay including an ion-exchange reaction product of a smectite clay and a compound of formula (II)

or a salt thereof, a solvate thereof, a stereoisomer thereof, or a mixture thereof, each relative to a total weight of the drilling fluid, wherein (i) each of $R_1$ is selected from the group consisting of an optionally substituted alkyl, an optionally substituted cycloalkyl, and an optionally substituted arylalkyl, (ii) each of $R_2$ and $R_3$, and $R_6$ and $R_7$ are independently selected from the group consisting of a hydrogen, an optionally substituted alkyl, and an optionally substituted cycloalkyl, (iii) each of $R_4$ and $R_5$ are independently selected from the group consisting of an optionally substituted alkyl, and an optionally substituted cycloalkyl, (iv) each of m is an integer in a range of 2-5, (v) n is an integer in a range of 3-8, (vi) $R_8$, $R_9$, $R_{10}$, and $R_{11}$ are independently selected from the group consisting of an optionally substituted alkyl, an optionally substituted cycloalkyl, an optionally substituted arylalkyl, and an optionally substituted aryl, and (vii) X and Y are independently an anion selected from the group consisting of a halide ion, a hexafluorophosphate ion, a trifluoromethanesulfonate ion, and a tetrafluoroborate ion.

In one embodiment, each of $R_1$ is an n-undecyl.

In one embodiment, each of $R_2$ and $R_3$, and $R_6$ and $R_7$ are a hydrogen.

In one embodiment, each of $R_4$ and $R_5$ are a methyl.

In one embodiment, each of m is 3, and n is 4.

In one embodiment, $R_8$, $R_9$, $R_{10}$ are a methyl, and Ru is an n-octyl.

In one embodiment, the smectite clay comprises montmorillonite.

In one embodiment, at least 50 mol % of exchangeable cations of the smectite clay are ion exchanged with quaternary ammonium cations from the compound of formula (II).

In one embodiment, X and Y are a bromide.

In one embodiment, the surfactant of formula (I) is

In one embodiment, the polyacrylamide is a copolymer formed by a reaction of an acrylamide monomer, an acrylate monomer, and a hydrophobicity modifying monomer which is at least one selected from the group consisting of N-acrylamidopropyl-N,N-dimethyl-N-dodecyl ammonium chloride, N-methacrylamidopropyl-N,N-dimethyl-N-dodecyl ammonium chloride, N-acrylamidopropyl-N,N-dimethyl-N-dodecyl ammonium bromide, N-methacrylamidopropyl-N,N-dimethyl-N-dodecyl ammonium bromide, N-acrylamidopropyl-N,N-dimethyl-N-octadecyl ammonium chloride, N-methacrylamidopropyl-N,N-dimethyl-N-octadecyl ammonium chloride, N-acrylamidopropyl-N,N-dimethyl-N-octadecyl ammonium bromide, and N-methacrylamidopropyl-N,N-dimethyl-N-octadecyl ammonium bromide, with the proviso that the acrylamide monomer is structurally different from the hydrophobicity modifying monomer.

In a further embodiment, a molar ratio of the acrylamide monomer to the acrylate monomer is in a range of 3:2 to 4:1, and a molar ratio of the acrylamide monomer to the hydrophobicity modifying monomer is in a range of 200:1 to 800:1.

In one embodiment, the polyacrylamide has a weight average molecular weight ranging from 12,000,000 g/mol to 20,000,000 g/mol.

In one embodiment, the drilling fluid contains (i) the aqueous base fluid, (ii) 0.1-0.5 wt % of the surfactant of formula (I), (iii) 0.1-0.5 wt % of the polyacrylamide; and (iv) 2-8 wt % of the organophilic clay comprising the ion-exchange reaction product of a smectite clay and the compound of formula (II), each relative to a total weight of the drilling fluid.

In one embodiment, the drilling fluid has a ten-second gel strength of 6.5-13 Pa, and a ten-minute gel strength of 9-20 Pa, at a temperature of 75-250° F.

In one embodiment, the drilling fluid has a yield stress of 5-12 Pa at a temperature of 75-250° F.

In one embodiment, the drilling fluid has a storage modulus in a range of 20-50 Pa with an angular frequency of 0.1-150 rad/s at a temperature of 75-125° F. and a pressure of 250-600 psi.

According to a second aspect, the present disclosure relates to a method of drilling a subterranean geological formation. The method involves the steps of drilling the subterranean geological formation to form a wellbore therein, and circulating the drilling fluid of the first aspect into the wellbore during the drilling.

In one embodiment, the wellbore has a temperature in a range of 75-400° F., and a pressure in a range of 250-1,000 psi.

In one embodiment, the subterranean geological formation is a shale formation.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
FIG. 1 is a picture of shale cuttings.

Embodiments of the present disclosure will now be described more fully hereinafter with reference to the accompanying drawings, in which some, but not all embodiments of the disclosure are shown.

As used herein, the words "a" and "an" and the like carry the meaning of "one or more". Within the description of this disclosure, where a numerical limit or range is stated, the endpoints are included unless stated otherwise. Also, all values and subranges within a numerical limit or range are specifically included as if explicitly written out.

As used herein, the words "about" or "substantially similar" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), or +/−15% of the stated value (or range of values).

As used herein, the terms "compound", "surfactant", and "product" are used interchangeably, and are intended to refer to a chemical entity, whether in the solid, liquid or gaseous phase, and whether in a crude mixture or purified and isolated.

As used herein, the term "solvate" refers to a physical association of a compound of this disclosure with one or more solvent molecules, whether organic or inorganic. This physical association includes hydrogen bonding. In certain instances, the solvate will be capable of isolation, for example when one or more solvent molecules are incorporated in the crystal lattice of the crystalline solid. The solvent molecules in the solvate may be present in a regular arrangement and/or a non-ordered arrangement. The solvate may comprise either a stoichiometric or nonstoichiometric amount of the solvent molecules. Solvate encompasses both solution phase and isolable solvates. Exemplary solvents include, but are not limited to, water, methanol, ethanol, n-propanol, isopropanol, n-butanol, isobutanol, tert-butanol, ethyl acetate and other lower alkanols, glycerine, acetone, dichloromethane (DCM), dimethyl sulfoxide (DMSO), dimethyl acetate (DMA), dimethylformamide (DMF), isopropyl ether, acetonitrile, toluene, N-methylpyrrolidone (NMP), tetrahydrofuran (THF), tetrahydropyran, other cyclic mono-, di- and tri-ethers, polyalkylene glycols (e.g. polyethylene glycol, polypropylene glycol, propylene glycol), and mixtures thereof in suitable proportions. Exemplary solvates include, but are not limited to, hydrates, ethanolates, methanolates, isopropanolates and mixtures thereof. Methods of solvation are generally known to those of ordinary skill in the art.

As used herein, the term "tautomer" refers to constitutional isomers of organic compounds that readily convert by tautomerization or tautomerism. The interconversion commonly results in the formal migration of a hydrogen atom or proton, accompanied by a switch of a single bond and adjacent double bond. Tautomerism is a special case of structural isomerism, and because of the rapid interconversion, tautomers are generally considered to be the same chemical compound. In solutions in which tautomerization is possible, a chemical equilibrium of the tautomers will be reached. The exact ratio of the tautomers depends on several factors including, but not limited to, temperature, solvent and pH. Exemplary common tautomeric pairs include, but are not limited to, ketone and enol, enamine and imine, ketene and ynol, nitroso and oxime, amide and imidic acid, lactam and lactim (an amide and imidic tautomerism in heterocyclic rings), and open-chain and cyclic fonos of an acetal or hemiacetal (e.g., in reducing sugars).

As used herein, the term "stereoisomer" refers to isomeric molecules that have the same molecular formula and sequence of bonded atoms (i.e. constitution), but differ in the three-dimensional orientations of their atoms in space. This contrasts with structural isomers, which share the same molecular formula, but the bond connection of their order differs. By definition, molecules that are stereoisomers of each other represent the same structural isomer. Enantiomers are two stereoisomers that are related to each other by reflection, they are non-superimposable mirror images. Every stereogenic center in one has the opposite configuration in the other. Two compounds that are enantiomers of each other have the same physical properties, except for the direction in which they rotate polarized light and how they interact with different optical isomers of other compounds. Diastereomers are stereoisomers not related through a reflection operation, they are not mirror images of each other. These include meso compounds, cis- and trans- (E- and Z-) isomers, and non-enantiomeric optical isomers. Diastereomers seldom have the same physical properties. In terms of the present disclosure, stereoisomers may refer to enantiomers, diastereomers, or both.

Conformers, rotamers, or conformational isomerism refers to a form of isomerism that describes the phenomenon of molecules with the same structural formula but with different shapes due to rotations around one or more bonds. Different conformations can have different energies, can usually interconvert, and are very rarely isolatable. There are some molecules that can be isolated in several conformations. Atropisomers are stereoisomers resulting from hindered rotation about single bonds where the steric strain barrier to rotation is high enough to allow for the isolation of the conformers. In terms of the present disclosure, stereoisomers may refer to conformers, atropisomers, or both.

In terms of the present disclosure, stereoisomers of the ring systems, stereogenic centers, and the like can all be present in the compounds, and all such stable isomers are contemplated in the present disclosure. S- and R- (or L- and D-) stereoisomers of the compounds of the present disclosure are described and may be isolated as a mixture of isomers or as separated isomeric forms. All processes or methods used to prepare compounds of the present disclosure and intermediates made therein are considered to be part of the present disclosure. When stereoisomeric products are prepared, they may be separated by conventional methods, for example, by chromatography, fractional crystallization, or use of a chiral agent.

As used herein, the term "alkyl" unless otherwise specified refers to both branched and straight chain saturated aliphatic primary, secondary, and/or tertiary hydrocarbons of typically $C_1$ to $C_{21}$, for example $C_1$, $C_2$, $C_3$, $C_4$, $C_5$, $C_6$, $C_7$, $C_8$, $C_9$, $C_{10}$, $C_{11}$, $C_{12}$, $C_{13}$, $C_{14}$, and specifically includes, but is not limited to, methyl, trifluoromethyl, ethyl, propyl, isopropyl, cyclopropyl, butyl, isobutyl, t-butyl, pentyl, cyclopentyl, isopentyl, neopentyl, hexyl, isohexyl, cyclohexyl, cyclohexylmethyl, 3-methylpentyl, 2,2-dimethylbutyl, 2,3-dimethylbutyl, 2-ethylhexyl, heptyl, octyl, nonyl, 3,7-dimethyloctyl, decyl, undecyl, dodecyl, tridecyl, 2-propylheptyl, tetradecyl, pentadecyl, hexadecyl, heptadecyl, octadecyl, nonadecyl, and eicosyl.

The term "cycloalkyl" refers to cyclized alkyl groups. Exemplary cycloalkyl groups include, but are not limited to, cyclopropyl, cyclobutyl, cyclopentyl, cyclohexyl, norbornyl, and adamantyl. Branched cycloalkyl groups such as exemplary 1-methylcyclopropyl and 2-methylcyclopropyl groups are included in the definition of cycloalkyl as used in the present disclosure.

The term "aryl", as used herein, and unless otherwise specified, refers to a substituent that is derived from an aromatic hydrocarbon (arene) that has had a hydrogen atom removed from a ring carbon atom. Aryl includes phenyl, biphenyl, naphthyl, anthracenyl, and the like.

The term "arylalkyl", as used herein, refers to a straight or branched chain alkyl moiety having 1 to 8 carbon atoms that is substituted by an aryl group as defined herein, and includes, but is not limited to, benzyl, phenethyl, 2-methylbenzyl, 3-methylbenzyl, 4-methylbenzyl, 2,4-dimethylbenzyl, 2-(4-ethylphenyl)ethyl, 3-(3-propylphenyl)propyl, and the like.

The term "halide", as used herein, means fluoride, chloride, bromide, and iodide.

As used herein, the term "substituted" refers to at least one hydrogen atom that is replaced with a non-hydrogen group, provided that normal valencies are maintained and that the substitution results in a stable compound. When a substituent is noted as "optionally substituted", the substituents are selected from halo, hydroxyl, alkoxy, oxo, alkanoyl, aryloxy, alkanoyloxy, amino, alkylamino, arylamino, arylalkylamino, disubstituted amines (e.g. in which the two amino substituents are selected from the exemplary group including, but not limited to, alkyl, aryl or arylalkyl), alkanoylamino, aroylamino, aralkanoylamino, substituted alkanoylamino, substituted arylamino, substituted aralkanoylamino, thiol, alkylthio, arylthio, arylalkylthio, alkylthiono, arylthiono, aryalkylthiono, alkylsulfonyl, arylsulfonyl, arylalkylsulfonyl, sulfonamide (e.g. —SO$_2$NH$_2$), substituted sulfonamide, nitro, cyano, carboxy, unsubstituted amide (i.e. —CONH$_2$), substituted amide (e.g. —CONHalkyl, —CONHaryl, —CONHarylalkyl or cases where there are two substituents on one nitrogen from alkyl, aryl, or alkylalkyl), alkoxycarbonyl, aryl, substituted aryl, guanidine, heterocyclyl (e.g. indolyl, imidazoyl, furyl, thienyl, thiazolyl, pyrrolidyl, pyridyl, pyrimidiyl, pyrrolidinyl, piperidinyl, morpholinyl, piperazinyl, homopiperazinyl and the like), substituted heterocyclyl and mixtures thereof. The substituents may themselves be optionally substituted, and may be either unprotected, or protected as necessary, as known to those skilled in the art, for example, as taught in Greene, et al., "Protective Groups in Organic Synthesis", John Wiley and Sons, Second Edition, 1991.

The present disclosure is intended to include all isotopes of atoms occurring in the present compounds. Isotopes include those atoms having the same atomic number but different mass numbers. By way of general example, and without limitation, isotopes of hydrogen include deuterium and tritium, isotopes of carbon include $^{13}$C and $^{14}$C, isotopes of nitrogen include $^{14}$N and $^{15}$N, and isotopes of oxygen include $^{16}$O, $^{17}$O and $^{18}$O. Isotopically labeled compounds of the disclosure can generally be prepared by conventional techniques known to those of ordinary skill in the art or by processes and methods analogous to those described herein, using an appropriate isotopically labeled reagent in place of the non-labeled reagent otherwise employed.

Various inhibitors have been examined to control the swelling of shale formations [Luckham, P. F., and Rossi, S., 1999, "The colloidal and rheological properties of bentonite suspensions," Advances in colloid and interface science, 82(1-3), pp. 43-92; Laird, D. A., 2006, "Influence of layer charge on swelling of smectites," Applied clay science, 34(1-4), pp. 74-87; Lantenois, S., Nedellec, Y., Prélot, B., Zajac, J., Muller, F., and Douillard, J.-M., 2007, "Thermodynamic assessment of the variation of the surface areas of two synthetic swelling clays during adsorption of water," Journal of colloid and interface science, 316(2), pp. 1003-1011; and Anderson, R., Ratcliffe, I., Greenwell, H., Williams, P., Cliffe, S., and Coveney, P., 2010, "Clay swelling—a challenge in the oilfield," Earth-Science Reviews, 98(3-4), pp. 201-216]. Potassium chloride (KCl) has been employed to minimize the swelling of clay. However, large amounts of resulting waste limits practical use of potassium chloride as a shale inhibitor. Ammonium-based compounds and their derivatives such as polyether amines, polyamine acids, hexamethylene diamine, and polyethoxylated diamines have been used to reduce the swelling of shale formations because of their smaller environmental impact. Polymeric cationic amines and quaternary ammonium salts have been evaluated for shale swelling inhibition [Salles, F., Bildstein, O., Douillard, J., Jullien, M., Raynal, J., and Van Damme, H., 2010, "On the cation dependence of interlamellar and interparticular water and swelling in smectite clays," Langmuir: the ACS journal of surfaces and colloids, 26(7), pp. 5028-5037; Steiger, R. P., 1982, "Fundamentals and use of potassium/polymer drilling fluids to minimize drilling and completion problems associated with hydratable clays," Journal of Petroleum Technology, 34(08), pp. 1,661-661,670; Sharma, S. K., and Kachari, J., 2010, "Use of KCl-Polymer Clouding Out Polyol Drilling Fluid in combating high pressure in deep exploratory wells of Assam Field: —A case study," SPE Oil and Gas India Conference and Exhibition, Society of Petroleum Engineers; Xuan, Y., Jiang, G., Li, Y., Yang, L., and Zhang, X., 2015, "Biodegradable oligo (poly-L-lysine) as a high-performance hydration inhibitor for shale," RSC Advances, 5(103), pp. 84947-84958; Zhong, H., Qiu, Z., Zhang, D., Tang, Z., Huang, W., and Wang, W., 2016, "Inhibiting shale hydration and dispersion with amine-terminated polyamidoamine dendrimers," Journal of Natural Gas Science and Engineering, 28, pp. 52-60; Patel, A., Stamatakis, S., Young, S., and Friedheim, J., 2007, "Advances in inhibitive water-based drilling fluids—can they replace oil-based muds?," International Symposium on Oilfield Chemistry, Society of Petroleum Engineers; and Suter, J., Coveney, P., Anderson, R., Greenwell, H., and Cliffe, S., 2011, "Rule based design of clay-swelling inhibitors," Energy & Environmental Science, 4(11), pp. 4572-4586].

Recently, cationic surfactants have been utilized to modify the rheological and filtration properties of water-based drilling fluids. Shittgar et al. have studied the impact of hexadecyl-trimethyl-ammonium bromide surfactant on the rheological, fluid loss, and shale inhibition characteristics of drilling fluids [Shettigar, R. R., Misra, N. M., and Patel, K., "Cationic surfactant (CTAB) a multipurpose additive in polymer-based drilling fluids," Journal of Petroleum Exploration and Production Technology, pp. 1-10]. The use of gemini surfactant in water-based drilling fluids has not been explored.

According to a first aspect, the present disclosure relates to a drilling fluid, which contains an aqueous base fluid, a surfactant, an organophilic clay, and a polyacrylamide.

In one or more embodiments, the drilling fluid comprises a surfactant of formula (I)

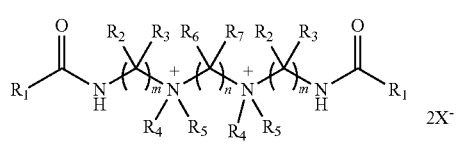

(I)

or a tautomer thereof, a stereoisomer thereof, or a mixture thereof. Gemini surfactants (or dimeric surfactants) have two hydrophilic groups and two hydrophobic groups in one molecule, in contrast to conventional surfactants that generally have a single hydrophilic group and a single hydrophobic group in one molecule. Gemini surfactants may be anionic, cationic, nonionic, or amphoteric. In one embodiment, the surfactant of formula (I) is a gemini surfactant.

Each of $R_1$ is selected from the group consisting of an optionally substituted alkyl, an optionally substituted cycloalkyl, and an optionally substituted arylalkyl. In a preferred embodiment, each of $R_1$ is an optionally substituted $C_{7-18}$ alkyl, an optionally substituted $C_{8-16}$ alkyl, an optionally substituted $C_{9-14}$ alkyl, an optionally substituted $C_{10-12}$ alkyl, or an optionally substituted $C_{11}$ alkyl. In one embodiment, each of $R_1$ is an unsubstituted alkyl, preferably a linear alkyl (e.g. n-propyl, n-heptyl, n-octyl, n-nonyl, n-decyl, n-undecyl, n-dodecyl). In another embodiment, each of $R_1$ is a branched alkyl, such as isopropyl, isobutyl, and 3,7-dimethyloctyl. In a most preferred embodiment, each of $R_1$ is an n-undecyl.

Each of $R_2$ and $R_3$, and $R_6$ and $R_7$ are independently selected from the group consisting of a hydrogen, an optionally substituted alkyl, and an optionally substituted cycloalkyl. In one or more embodiments, each of $R_2$ and $R_3$, and $R_6$ and $R_7$ are independently selected from the group consisting of a hydrogen and a methyl. In one embodiment, each of $R_2$ and $R_3$ are the same. In another embodiment, each of $R_2$ and $R_3$ are different. In one embodiment, $R_6$ and $R_7$ are the same. In another embodiment, $R_6$ and $R_7$ are different. In a preferred embodiment, each of $R_2$ and $R_3$, and $R_6$ and $R_7$ are a hydrogen.

Each of $R_4$ and $R_5$ are independently selected from the group consisting of an optionally substituted alkyl, and an optionally substituted cycloalkyl. Preferably, each of $R_4$ and $R_5$ are independently an optionally substituted $C_{1-6}$ alkyl, an optionally substituted $C_{2-5}$ alkyl, or an optionally substituted $C_{3-4}$ alkyl. In one or more embodiments, each of $R_4$ and $R_5$ are independently selected from the group consisting of a methyl, an ethyl, and an isopropyl. In a preferred embodiment, each of $R_4$ and $R_5$ are a methyl.

As used herein, the value of m denotes an alkyl chain of —C($R_2$)($R_3$)— groups of the surfactant of formula (I). In one or more embodiments, each of m is an integer in a range of 2-5, preferably 3-4. Most preferably, each of m is 3.

As used herein, the value of n denotes an alkyl chain of —C($R_6$)($R_7$)— groups of the surfactant of formula (I). In one or more embodiments, n is an integer in a range of 3-8, preferably 4-7, preferably 5-6. In a preferred embodiment, n is 4.

The term "anion" means a negatively charged ion including, but not limited to, halides, such as fluoride, chloride, bromide, and iodide, nitrate, sulfate, phosphate, methanesulfonate, ethanesulfonate, p-toluenesulfonate, salicylate, malate, maleate, succinate, tartrate, citrate, acetate, perchlorate, trifluoromethanesulfonate, acetylacetonate, tetrafluoroborate, hexafluorophosphate, and hexafluoroacetylacetonate. In one embodiment, X of the surfactant of formula (I) is an anion selected from the group consisting of a halide ion, a hexafluorophosphate ion, a trifluoromethanesulfonate ion, and a tetrafluoroborate ion. In a preferred embodiment, X is a halide, such as a chloride, a bromide, a fluoride, and an iodide. Most preferably, X is a bromide.

In a preferred embodiment, the surfactant of formula (I) is

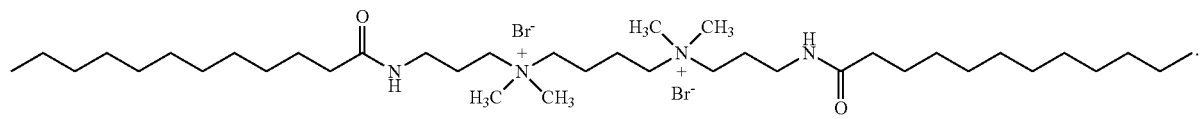

The surfactant of formula (I) disclosed herein in any its embodiments may be present in an amount of 0.01-2 wt % relative to a total weight of the drilling fluid, preferably 0.025-1.5 wt %, preferably 0.05-1 wt %, preferably 0.1-0.75 wt %, preferably 0.15-0.5 wt %, preferably 0.2-0.3 wt %, preferably about 0.25 wt % relative to a total weight of the drilling fluid.

Organophilic clay is an important additive of drilling fluid formulations. Interaction between organic molecules and clay platelets may produce hydrophobic surfaces on clay minerals and thus forming organophilic clay. Organic molecules such as alkyl ammonium cations can replace the interlayer cations of clay minerals. Organophilic clays can be produced by reacting ethylene glycol with clay minerals through a grafting process. Organophilic clays have been used as a rheology control modifier in many applications in oil industry, paint production, and cosmetic manufacturing [De Paiva, L. B., Morales, A. R., and Diaz, F. R. V., 2008, "Organoclays: properties, preparation and applications," Applied clay science, 42(1-2), pp. 8-24; and MacEwan, D. M., Wilson, M., Brindley, G., and Brown, G., 1980, "Interlayer and intercalation complexes of clay minerals," Crystal structures of clay minerals and their X-ray identification, 5, pp. 197-248].

Clay minerals are characterized by two-dimensional sheets of corner-sharing $SiO_4$ tetrahedra and/or $AlO_4$ octahedra. The sheet units have the chemical composition $(Al, Si)_3O_4$. Each silica tetrahedron shares 3 of its vertex oxygen atoms with other tetrahedra forming a hexagonal array in two-dimensions. The fourth vertex is not shared with another tetrahedron and all of the tetrahedra "point" in the same direction; i.e. all of the unshared vertices are on the same side of the sheet.

In clay minerals, the tetrahedral sheets are bonded to octahedral sheets formed from small cations, such as aluminum, magnesium, and lithium, and are coordinated by six oxygen atoms. Each unshared vertex from the tetrahedral sheet also forms part of one side of the octahedral sheet, but an additional oxygen atom is located above the gap in the tetrahedral sheet at the center of the six tetrahedra. This oxygen atom is bonded to a hydrogen atom forming an OH group in the clay structure. Clay minerals can be categorized depending on the way that tetrahedral and octahedral sheets are packaged into layers. If there is only one tetrahedral and one octahedral group in each layer, the clay is known as a 1:1 clay. The alternative, known as a 2:1 clay, has two tetrahedral sheets with the unshared vertex of each sheet pointing towards each other and forming each side of the octahedral sheet. In other words, a tetrahedral double layer sandwiches an octahedral layer.

Bonding between the tetrahedral and octahedral sheets may require that the tetrahedral sheet becomes corrugated or twisted, causing ditrigonal distortion to the hexagonal array, and the octahedral sheet may be flattened. This minimizes the overall bond-valence distortions of the crystallite. Depending on the composition of the tetrahedral and octahedral sheets, the layer will have no charge, or will have a net negative charge. If the layers are charged this charge is balanced by interlayer cations such as $Na^+$ or $K^+$. In each case, the interlayer may contain water. The crystal structure is formed from a stack of layers interspaced with the interlayers.

Exemplary types of clay mineral include, but are not limited to, smectite, kaolin, illite, chlorite, sepiolite, attapulgite, or some other type. Smectites include dioctahedral smectites such as montmorillonite, nontronite, bentonite, and beidellite, as well as trioctahedral smectites such as saponite, hectorite, and stevensite. In general, dioctahedral smectites have an average of 2 of every 3 octahedral sites occupied by a cation, while trioctahedral smectites have approximately all 3 of every 3 octahedral sites occupied by a cation. Kaolins include the minerals kaolinite, dickite, halloysite, and nacrite. Illites include clay-micas and illite. Chlorites include baileychlore, chamosite, clinochlore, cookeite, donbassite, gonyerite, nimite, odinite, orthochamosite, pennantite, ripidolite, and sudoite. Other 2:1 clay types exist such as sepiolite or attapulgite. Preferably, the clay mineral described herein is a smectite clay. The smectite clay may be a natural clay or a synthetic clay.

In a preferred embodiment, the smectite clay is montmorillonite. Structurally, montmorillonite has a dioctahedral structure. This means the two higher charged aluminum cations (i.e., $Al^{3+}$) occupy two octahedral sites between the $SiO_4$ tetrahedral layers and offers $6^+$ charges in the structure represented by $Na_{0.33}[Al_2]Si_4O_{10}[OH]_2$. It is equally envisaged that the clay mineral may contain other clay types as previously specified, preferably other smectite clays in addition to or in lieu of the montmorillonite. For example, the clay mineral may include a mixture of nontronite, beidellite, saponite, and/or stevensite in addition to or in lieu of the montmorillonite. Alternatively, the clay mineral may include bentonite clay, which contains a mixture of clay species such as montmorillonite, illite, and/or kaolinite. Preferably, the montmorillonite is present in the smectite clay in an amount greater than 50 wt %, preferably greater than 70 wt %, more preferably greater than 90 wt %, relative to a total weight of the smectite clay.

Because of substitution of lower valence cations, smectite clays carry a net negative charge on the clay sheets that may be neutralized by metal cations that are positioned on the surfaces of the clay. For example, due to isomorphous substitution of Mg for Al in the central alumina plane, montmorillonite carries a net negative charge that can attract cations such as sodium and calcium ions. In one embodiment, the smectite clay of the present disclosure has exchangeable inorganic cations. Preferably, the exchangeable inorganic cations of the smectite clay may be sodium, calcium, potassium, magnesium, or some other cation. Most preferably, the exchangeable cations are sodium, calcium, or both.

As used herein, the term "cation-exchange capacity" ("CEC") refers to the amount of positive charge that can be exchanged per mass of clay. An equivalent unit of milliequivalent per 100 grams (meq/100 g) is centimole per kilogram (cmole/kg), where cmole represents the molar amount of exchangeable positive charge. Measurements of cation-exchange capacity are known to those of ordinary skill in the art. For example, the cation exchange capacity may be determined as the amount of cations that can be ion exchanged with a 1 M solution of ammonium acetate at pH of about 7. In one embodiment, the smectite has a cation-exchange capacity of at least 50 meq of exchangeable cations per 100 grams of the clay, preferably 75-300 meq of exchangeable cations per 100 grams of the clay, more preferably 100-200 meq of exchangeable cations per 100 grams of the clay, at pH of 6-8, 6.5-7.5, or about 7.

The exchangeable inorganic cations of the smectite clays may be exchanged with cations, preferably organic cations of a salt that is in contact with the smectite clay. In one or more embodiments, the drilling fluid comprises an organophilic clay including an ion-exchange reaction product of the clay mineral, preferably the aforementioned smectite clay, and a compound of formula (II)

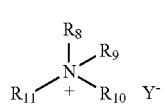
(II)

or a salt thereof, a solvate thereof, a stereoisomer thereof, or a mixture thereof. As used herein, quaternary ammonium salts are compounds having a quaternary ammonium cation which is a positively charged central nitrogen atom with four substituents, especially alkyl and/or aryl groups, discounting hydrogen, and a counter anion. In one embodiment, the compound of formula (II) is a quaternary ammonium salt.

$R_8$, $R_9$, $R_{10}$, and $R_{11}$ are independently selected from the group consisting of an optionally substituted alkyl, an optionally substituted cycloalkyl, an optionally substituted arylalkyl, and an optionally substituted aryl. In one embodiment, $R_8$, $R_9$, and $R_{10}$ are independently an optionally substituted $C_{1-5}$ alkyl, an optionally substituted $C_{2-4}$ alkyl, or an optionally substituted $C_3$ alkyl. In a preferred embodiment, $R_8$, $R_9$, $R_{10}$ are a methyl. In one embodiment, $R_{11}$ is an optionally substituted $C_{6-16}$ alkyl, an optionally substituted $C_{7-14}$ alkyl, an optionally substituted $C_{8-12}$ alkyl, or an optionally substituted $C_{9-10}$ alkyl. In one embodiment, $R_{11}$ is an unsubstituted alkyl, preferably a linear alkyl (e.g. n-propyl, n-heptyl, n-octyl, n-nonyl, n-decyl, n-undecyl, n-dodecyl). In another embodiment, Ru is a branched alkyl, such as isopropyl, isobutyl, and 3,7-dimethyloctyl. In a most preferred embodiment, $R_{11}$ is an n-octyl.

In one embodiment, Y of the compound of formula (II) is an anion selected from the group consisting of a halide ion, a hexafluorophosphate ion, a trifluoromethanesulfonate ion, a tetrafluoroborate ion, a nitrate ion, and an acetate ion. In a preferred embodiment, Y is a halide, such as a chloride, a bromide, a fluoride, and an iodide. Most preferably, Y is a bromide.

Examples of compound of formula (II) applicable to the present disclosure include, but are not limited to, trimethyloctylammonium bromide, trimethyloctylammonium chloride, cetyltrimethylammonium chloride, decyltrimethylammonium bromide, dodecyltrimethylammonium chloride, hexadecyltrimethylammonium bromide, hexyltrimethylammonium bromide, (5-bromopentyl)trimethylammonium bromide, (3-carboxypropyl)trimethylammonium chloride, benzyldimethyloctylammonium chloride, methyltrioctylammonium bromide, methyltrioctylammonium chloride, tetraoctylammonium bromide, tetraoctylammonium chloride, benzalkonium chloride, benzyldimethyldecylammonium chloride, benzyldimethyldodecylammonium chloride, benzyldimethylhexylammonium chloride, benzyldodecyldimethylammonium bromide, didodecyldimethylammonium bromide, dimethyldioctadecylammonium bromide, dodecylethyldimethylammonium bromide, tetrahexylammonium hexafluorophosphate, tetrahexylammonium tetrafluoroborate, tetrabutylammonium trifluoromethanesulfonate, tetrabutylammonium nitrate, and tetrabutylammonium acetate. In a most preferred embodiment, the compound of formula (II) is trimethyloctylammonium bromide.

The ion-exchange reaction may be partially completed or driven to completion. In one embodiment, at least 50 mol % of exchangeable cations of the aforementioned smectite clay (e.g. montmorillonite) are ion exchanged with the quaternary ammonium cations of the compound of formula (II), preferably 55-95 mol %, preferably 60-90 mol %, preferably 65-85 mol %, preferably 70-80 mol %, preferably 75-78 mol % of exchangeable cations of the aforementioned smectite clay are ion exchanged with the quaternary ammonium cations of the compound of formula (II).

In one embodiment, the ion-exchange reaction of the smectite clay and the compound of formula (II) is performed in the presence of a solvent, preferably a polar solvent. Exemplary polar solvents include, but are not limited to, water, methanol, ethanol, 1-propanol, isopropanol, ethylene glycol, propylene glycol, glycerol, or mixtures thereof.

The organophilic clay may be prepared by reacting the smectite clay (e.g. montmorillonite) and the compound of formula (II) (e.g. trimethyloctylammonium bromide) in the presence of a solvent via methods known to those of ordinary skill in the art. For example, a suspension of the clay and the solvent (e.g. water) may be mixed with the compound of formula (II) to form a reaction mixture. Mixings may occur via stirring, shaking, swirling, sonicating, blending, or by otherwise agitating a reaction mixture. In one embodiment, the reaction mixture is stirred by a magnetic stirrer or an overhead stirrer. In another embodiment, the reaction mixture is left to stand (i.e. not stirred). Alternatively, the reaction mixture is subjected to ultrasonication. The ultrasonication may be performed using an ultrasonic bath or an ultrasonic probe. The reaction mixture may be agitated at a temperature of 4-70° C., 10-50° C., or 20-35° C.

After mixing the smectite clay and the compound of formula (II) in the presence of the solvent, the ion-exchange reaction is allowed to take place for an appropriate time to partially or fully ion exchange the exchangeable cations of the smectite clay with the quaternary ammonium cations of the compound of formula (II). In one embodiment, the ion-exchange reaction is carried out for 0.5-48 hours, 4-36 hours, or 8-24 hours. Once the ion-exchange reaction is deemed sufficiently complete, a solid may be separated from the reaction mixture and dried to remove the solvent, thereby forming the organophilic clay.

The organophilic clay disclosed herein in any its embodiments may be present in an amount of 0.5-15 wt % relative to a total weight of the drilling fluid, preferably 1-12 wt %, preferably 1.5-10 wt %, preferably 2-8 wt %, preferably 2.5-6 wt %, preferably 3-5 wt %, preferably about 4 wt % relative to a total weight of the drilling fluid.

Polymer-based drilling fluids are often considered as high performance drilling fluids for horizontal drilling, multilateral drilling, and water sensitive shale formations. Several polymers with shale inhibition efficiency such as starch, xanthan gum, and low viscosity polyanionic cellulose have been employed in conjunction with KCl for formulating water-based polymer drilling fluids. Partially hydrolyzed polyacrylamide (PHPA) in conjunction with KCl was used as a shale inhibitor [Patel, A., Stamatakis, S., Young, S., and Friedheim, J., 2007, "Advances in inhibitive water-based drilling fluids—can they replace oil-based muds?," International Symposium on Oilfield Chemistry, Society of Petroleum Engineers; Kjosnes, I., Loklingholm, G., Saasen, A., Syrstad, S., Agle, A., and Solvang, K.-A., 2003, "Successful water based drilling fluid design for optimizing hole cleaning and hole stability," SPE/IADC Middle East Drilling Technology Conference and Exhibition, Society of Petroleum Engineers; Simonides, H., Schuringa, G., and Ghalambor, A., 2002, "Role of starch in designing nondamaging completion and drilling fluids," International Symposium and Exhibition on Formation Damage Control, Society of Petroleum Engineers]. Both cationic and anionic polymers have been evaluated on their impact on the rheological properties, filtration characteristics, as well as shale swelling inhibition properties of water-based drilling fluids.

As used herein, monomers are molecules which can undergo polymerization, thereby contributing constitutional repeating units to the structures of a macromolecule or polymer. The process by which monomers combine end to end to form a polymer is referred to herein as "polymerization".

As used herein, a "copolymer" refers to a polymer derived from more than one species of monomer and are obtained by "copolymerization" of more than one species of monomer. Copolymers obtained by copolymerization of two monomer and/or oligomer species may be termed bipolymers, those obtained from three monomers may be termed terpolymers and those obtained from four monomers may be termed quarterpolymers, etc.

As used herein, the term "polyacrylamide" refers to polyacrylamide-based copolymers such as polyacrylamide-based biopolymers, polyacrylamide-based terpolymers, polyacrylamide-based quarterpolymers, and the like, modified polyacrylamides, and combinations thereof.

In one or more embodiments, the polyacrylamide of the present disclosure is a copolymer formed by a reaction of an acrylamide monomer, an acrylate monomer, and a hydrophobicity modifying monomer which is at least one selected from the group consisting of N-acrylamidopropyl-N,N-dimethyl-N-dodecyl ammonium chloride, N-methacrylamidopropyl-N,N-dimethyl-N-dodecyl ammonium chloride, N-acrylamidopropyl-N,N-dimethyl-N-dodecyl ammonium bromide, N-methacrylamidopropyl-N,N-dimethyl-N-dodecyl ammonium bromide, N-acrylamidopropyl-N,N-dimethyl-N-octadecyl ammonium chloride, N-methacrylamidopropyl-N,N-dimethyl-N-octadecyl ammonium chloride, N-acrylamidopropyl-N,N-dimethyl-N-octadecyl ammonium bromide, and N-methacrylamidopropyl-N,N-dimethyl-N-octadecyl ammonium bromide, with the proviso that the acrylamide monomer is structurally different from the hydrophobicity modifying monomer.

It is equally envisaged that other polymerizable molecules with hydrophobic moieties such as alkene/vinyl monomers (e.g. vinyl chloride, propene, tetrafluoroethylene, vinyl trifluoroacetate, vinyl butyrate, vinyl decanoate, vinyl propionate), and styrenes (e.g. styrene, 2-(trifluoromethyl)styrene, 3-(trifluoromethyl)styrene, 4-(trifluoromethyl)styrene, 3-methylstyrene, 4-methylstyrene, 2-fluorostyrene, 3-fluorostyrene, 4-fluorostyrene, 2,6-difluorostyrene, 2,3,4,5,6-pentafluorostyrene, 4-tert-butylstyrene, 2,4,6-trimethylstyrene, divinylbenzene) may be used in addition to or in lieu of the aforementioned hydrophobicity modifying monomer.

Exemplary acrylamide monomers that may be useful in the present disclosure include, but are not limited to, acrylamide, N-ethylacrylamide, N-isopropylacrylamide, N-tert-butylacrylamide, N-hydroxymethylacrylamide, N-hydroxyethylacrylamide, N-[tris(hydroxymethyl)methyl] acrylamide, N-acryloyl-L-valine, diacetone acrylamide, N,N-dimethylacrylamide, N,N-diethylacrylamide, and mixtures thereof.

It is equally envisaged that methacrylamide monomer(s) may be used in addition to or in lieu of the acrylamide monomer(s). Exemplary methacrylamide monomers that may be useful in the present disclosure include, but are not limited to, methacrylamide, 2-aminoethylmethacrylamide, N-(3-aminopropyl)methacrylamide, N,N-diethylmethacrylamide, (4-hydroxyphenyl)methacrylamide, 2-hydroxypropyl methacrylamide, N-isopropylmethacrylamide, N-(triphenylmethyl)methacrylamide, N,N'-hexamethylenebis (methacrylamide), and mixtures thereof.

In one embodiment, the acrylamide monomer used herein is at least one selected from the group consisting of acrylamide, methacrylamide, N-isopropylacrylamide, and N,N-dimethylacrylamide. In at least one embodiment, the acrylamide monomer is acrylamide.

Non-limiting examples of applicable acrylate monomers include acrylic acid, methyl acrylate, ethyl acrylate, propyl acrylate, butyl acrylate, isobutyl acrylate, tert-butyl acrylate, pentyl acrylate, neopentyl acrylate, hexyl acrylate, cyclohexyl acrylate, heptyl acrylate, cyclohexylmethyl acrylate, octyl acrylate, 2-ethylhexyl acrylate, isooctyl acrylate, decyl acrylate, dodecyl acrylate, tetradecyl acrylate, hexadecyl acrylate, octadecyl acrylate, behenyl acrylate, ethyleneglycol diacrylate, neopentylglycol diacrylate, 1,6-hexanediol ethoxylate diacrylate, 1,3-butanediol diacrylate, 1,6-hexanediol diacrylate, 1,4-butanediol diacrylate, di(ethylene glycol) diacrylate, 3-sulphopropyl acrylate (SPA), and mixtures thereof. In one embodiment, the acrylate monomer is anionic. In a preferred embodiment, the acrylate monomer used herein is acrylic acid.

It is equally envisaged that methacrylate monomer(s) may be used in addition to or in lieu of the acrylate monomer(s). Non-limiting examples of methacrylate monomers include methacrylic acid, methyl methacrylate (MMA), 2-hydroxyethyl methacrylate (HEMA), isopropyl methacrylate, n-propyl methacrylate, isopropyl methacrylate, n-butyl methacrylate, isobutyl methacrylate, hydroxyethyl methacrylate, hydroxypropyl methacrylate, hydroxybutyl methacrylate, propylene glycol monomethacrylate, isobornyl methacrylate, methoxyethoxyethyl methacrylate, ethoxyethoxyethyl methacrylate, tetrahydrofurfuryl methacrylate, acetoxyethyl methacrylate, phenoxyethylmethacrylate, methacryloyloxyethyl phthalate (MEP), bisphenol A-glycidyl methacrylate (bis-GMA), urethane dimethacrylate (UDMA), triethylene glycol dimethacrylate (TEGDMA), ethoxylated bisphenol A dimethacrylate (bis-EMA), ethyleneglycol dimethacrylate, diethyleneglycol dimethacrylate, 1,3-propanediol dimethacrylate, 1,4-butanediol dimethacrylate, 1,6-hexanediol dimethacrylate, 1,12-dodecanediol dimethacrylate, pyromellitic acid glycerol dimethacrylate (PMGDM), and mixtures thereof.

In one or more embodiments, a molar ratio of the acrylamide monomer to the acrylate monomer is in a range of 3:2 to 4:1, preferably 1.8:1 to 7:2, preferably 2:1 to 3:1, preferably 2.2:1 to 5:2. In a related embodiment, a molar ratio of the acrylamide monomer to the hydrophobicity modifying monomer is in a range of 200:1 to 800:1, preferably 250:1 to 750:1, preferably 300:1 to 700:1, preferably 350:1 to 650:1, preferably 400:1 to 600:1, preferably 450:1 to 550:1, preferably 475:1 to 500:1. In at least one embodiment, the hydrophobicity modifying monomer is present in an amount of up to 0.29% by mole, preferably 0.05-0.28% by mole, preferably 0.1-0.25% by mole, preferably 0.15-0.2% by mole relative to a total amount of the acrylamide, the acrylate, and the hydrophobicity modifying monomer.

In one or more embodiments, the polyacrylamide of the present disclosure has a weight average molecular weight ranging from 320,000 g/mol to 40,000,000 g/mol, preferably 500,000 g/mol to 32,000,000 g/mol, preferably 1,000,000 g/mol to 28,000,000 g/mol, preferably 5,000,000 g/mol to 24,000,000 g/mol, preferably 10,000,000 g/mol to 18,000,000 g/mol, or about 16,000,000 g/mol.

The polyacrylamide used herein may be synthesized via procedures known to those of ordinary skill in the art. For example, the polyacrylamide may be prepared via gel polymerization, precipitation polymerization, or suspension polymerization of a mixture of the aforementioned acrylamide, acrylate, and hydrophobicity modifying monomer in specified molar ratios in the presence of a radical initiator such as potassium persulfate, azobisisobutyronitrile (AIBN), and 4,4'-azobis(4-cyanovaleric acid). Alternatively, the polyacrylamide used herein may be available from commercial vendors such as SNF Floerger (France) [High molecular weight associative amphoteric polymers and uses thereof, Nicolas Gaillard, and Cédrick Favero, U.S. Pat. No. 7,700,702 B2, incorporated herein by reference in its entirety].

The polyacrylamide disclosed herein in any its embodiments may be present in an amount of 0.01-2 wt % relative to a total weight of the drilling fluid, preferably 0.025-1.5 wt %, preferably 0.05-1 wt %, preferably 0.1-0.75 wt %, preferably 0.15-0.5 wt %, preferably 0.2-0.3 wt %, preferably about 0.25 wt % relative to a total weight of the drilling fluid.

As used here, the term "aqueous base fluid" refers to any water containing solution, including saltwater, hard water, and/or fresh water. For purposes of this description, the term "saltwater" includes saltwater with a chloride ion content of between about 6000 ppm and saturation, and is intended to encompass seawater and other types of saltwater including groundwater comprising additional impurities typically found therein. The term "hard water" includes water having mineral concentrations between about 2000 mg/L and about 300,000 mg/L. The term "fresh water" includes water sources that comprise less than 6000 ppm, preferably less than 5000 ppm, preferably less than 4000 ppm, preferably less than 3000 ppm, preferably less than 2000 ppm, preferably less than 1000 ppm, preferably less than 500 ppm of salts, minerals, or any other dissolved solids. Exemplary salts that may be present in saltwater, hard water, and/or fresh water include, but are not limited to, cations such as sodium, magnesium, calcium, potassium, ammonium, and iron, and anions such as chloride, bicarbonate, carbonate, sulfate, sulfite, phosphate, iodide, nitrate, acetate, citrate, fluoride, and nitrite.

The aqueous base fluid may be supplied from a natural source, such as an aquifer, a lake, and/or an ocean, and may be filtered to remove large solids before being used in the drilling fluid. Alternatively, the aqueous base fluid may be produced water (byproduct of the oil industry), tap water, distilled water, doubly distilled water, deionized water, deionized distilled water, or combinations thereof. In at least one embodiment, the aqueous base fluid used herein is distilled water. The aqueous base fluid may be present in the drilling fluid with a weight percentage in a range of 50-99.48 wt %, preferably 60-95.5 wt %, more preferably 70-90 wt %, even more preferably 80-85 wt %, relative to a total weight of the drilling fluid. In one embodiment, the drilling fluid may be considered a water-based drilling fluid.

In a preferred embodiment, the drilling fluid contains (i) the aqueous base fluid, (ii) 0.1-0.5 wt %, preferably 0.15-0.4 wt %, more preferably 0.2-0.3 wt %, most preferably about 0.25 wt % of the surfactant of formula (I), (iii) 2-8 wt %, preferably 2.5-7 wt %, more preferably 3-6 wt %, most preferably about 4 wt % of the organophilic clay comprising the ion-exchange reaction product of the smectite clay and the compound of formula (II), and (iv) 0.1-0.5 wt %, preferably 0.15-0.4 wt %, more preferably 0.2-0.3 wt %, most preferably about 0.25 wt % of the polyacrylamide, each relative to a total weight of the drilling fluid.

As used herein, the term "gel strength" refers to the shear stress measured at a low shear rate after a drilling fluid has set quiescently for a set period of time. According to standard API procedures, the gel strength is measured after setting for 10 seconds and 10 minutes, although measurements at longer time intervals can also be made such as, for example, 30 minutes or 16 hours.

In one embodiment, the drilling fluid has a ten-second gel strength of 6.5-13 Pa, preferably 6.7-12 Pa, preferably 8.7-10.6 Pa, preferably 9-10 Pa, and a ten-minute gel strength of 9-20 Pa, preferably 11-18 Pa, preferably 13-16 Pa, preferably 14-15 Pa. These gel strengths may be measured at a temperature of 75-250° F., 100-200° F., or about 150° F. In a related embodiment, the ten-second gel strength of the drilling fluid disclosed herein is at least 50% greater, preferably 55-80% greater, preferably 60-70% greater than a substantially similar drilling fluid that is devoid of the surfactant of formula (I) and the polyacrylamide at a temperature of 125-250° F., 150-225° F., or 175-200° F. (see FIGS. 4 and 5). In another related embodiment, the ten-minute gel strength of the drilling fluid disclosed herein is at least 45% greater, preferably 50-75% greater, preferably 55-65% greater than a substantially similar drilling fluid that is devoid of the surfactant of formula (I) and the polyacrylamide at a temperature of 125-250° F., 150-225° F., or 175-200° F. (see FIGS. 4 and 5). In a further embodiment, the gel strength of the drilling fluid of the present disclosure increases as the temperature increases (see FIG. 5).

As used herein, "yield stress" refers the stress at which a material begins to flow (or to yield). The yield stress of the drilling fluid of the present disclosure may be obtained using the Herschel Bulkley rheological model (see Example 4).

In one embodiment, the drilling fluid has a yield stress of 5-12 Pa, preferably 7-10 Pa, more preferably 8-9 Pa at a temperature of 75-250° F., 100-200° F., or about 150° F. In one or more embodiments, the yield stress of the drilling fluid disclosed herein is at least 40% greater, preferably 50-90% greater, preferably 60-70% greater than a substantially similar drilling fluid that is devoid of the surfactant of formula (I) and the polyacrylamide at a temperature of 125-250° F., 150-225° F., or 175-200° F. (see FIG. 6).

Storage modulus measures the stored energy representing the elastic portion of the viscoelastic behavior in viscoelastic materials. In one embodiment, the drilling fluid has a storage modulus in a range of 20-75 Pa, preferably 25-50 Pa, more preferably 30-45 Pa, even more preferably 35-40 Pa, with an angular frequency of 0.1-150 rad/s, 0.5-100 rad/s, 1-50 rad/s, or 10-25 rad/s, at a temperature of 75-150° F., preferably 85-130° F., more preferably 90-110° F., or about 100° F., and a pressure of 250-600 psi, 275-400 psi, or about 300 psi. In a further embodiment, with the above conditions, the storage modulus of the drilling fluid is at least 50% greater, preferably at least 55% greater, more preferably at least 60% greater than that of a substantially similar drilling fluid that is devoid of the surfactant of formula (I) and the polyacrylamide over the entire frequency range (see FIG. 7).

According to a second aspect, the present disclosure relates to a method of drilling a subterranean geological formation. The method involves the steps of drilling the subterranean geological formation to form a wellbore therein, and circulating the drilling fluid of the first aspect in any of its embodiments into the wellbore before, during or after the drilling. The subterranean geological formation may be a shale formation, a clay formation, a carbonate formation, a sandstone formation, or like formation. In one preferred embodiment, the subterranean geological formation is a shale formation, which contains clay minerals and quartz. In another preferred embodiment, the subterranean geological formation is a clay formation, which contains chlorite, illite, kaolinite, montmorillonite and smectite. In some embodiments, the subterranean geological formation is a carbonate formation, e.g. limestone or dolostone, which contains carbonate minerals, such as calcite, aragonite, dolomite, etc. In another embodiment, the subterranean geological formation is a sandstone formation, for example, a formation which contains quartz, feldspar, rock fragments, mica and numerous additional mineral grains held together with silica and/or cement. In at least one embodiment, the subterranean geological formation is a Qusaiba shale formation, preferably a Qusaiba shale formation found in the north-western area of Saudi Arabia.

A "wellbore" refers to a part of any geological formation that may contain various combinations of natural gas (i.e., primarily methane), light hydrocarbon, or non-hydrocarbon gases (including condensable and non-condensable gases), light hydrocarbon liquids, heavy hydrocarbon liquids, crude oil, rock, oil shale, bitumen, oil sands, tar, coal, and/or water. Exemplary non-condensable gases include hydrogen, helium, carbon monoxide, carbon dioxide, methane, and other light hydrocarbons. In one embodiment, the wellbore is a vertical wellbore, a horizontal wellbore, a multilateral wellbore, or an extended reach wellbore.

The method involves drilling the subterranean geological formation to form a wellbore therein. The drilling fluid of the first aspect in any of its embodiments may be injected into the formation and circulated through the wellbore, often during the drilling. In some embodiments, the drilling comprises the steps of identifying a site of interest, and creating a starter hole in the ground at that site. A drill bit, which may be coupled to a hydraulic pump, may be driven through the starter hole. The drill bit and the hydraulic pump are not meant to be limiting and various types of drill bits and hydraulic pumps, as known to those of ordinary skill in the art, may be utilized here. A pumping system may be used to circulate drilling fluid in the wellbore during the drilling. During the drilling, the drilling fluid may be circulated through the wellbore to lubricate and/or cool the drill bit and to further remove drilling cuttings.

As used herein, the term "water injection" or "waterflooding" refers to a method of oil recovery in which water or a fluid is injected into a petroleum reservoir to sweep and displace mobile oil from a subterranean geological formation. The water injected increases pressure within the reservoir, replenishing the natural reservoir pressure that has been previously depleted in primary recovery, and physically sweeps the displaced mobile oil to adjacent production wells. The method disclosed herein may further involve collecting hydrocarbons from the subterranean geological formation.

The step of collecting hydrocarbons may be performed by injecting the drilling fluid into a first wellbore (e.g. an injection wellbore) connected to the formation and then collecting hydrocarbons from a second wellbore (e.g. a production wellbore) that is connected to the formation. Alternatively, the method may be performed by injecting the drilling fluid into a wellbore connected to the formation, and then collecting hydrocarbons from the same wellbore. Injection pressures and flow rates of the composition may be kept constant or varied. For example, the injection pressure of the drilling fluid may be up to 5,000 psi, preferably 50-3,000 psi, preferably 100-1,000 psi. In a related embodiment, the injection flow rate of the drilling fluid may be 0.1-50 mL/min, preferably 0.5-20 mL/min, preferably 1-10 mL/min. The hydrocarbons may be collected and separated from the injected drilling fluid at a fluids processing facility using fluids separation reagents such as emulsion breakers and water clarifiers.

In some embodiments, the drilling fluid for injection is prepared by pre-mixing the surfactant of formula (I), the organophilic clay, and the polyacrylamide with the aqueous base fluid that may be taken from nearby water sources or prepared on site prior to the injection. In an alternative embodiment, components of the drilling fluid formulation (i.e. the surfactant of formula (I), the organophilic clay, and the polyacrylamide) may be injected simultaneously with the aqueous base fluid into the formation in an amount sufficient to produce the drilling fluid in situ. In another alternative embodiment, components of the drilling fluid formulation may be injected sequentially with the aqueous base fluid into the formation.

In one or more embodiments, the wellbore has a downhole temperature in a range of 75-400° F., preferably 90-350° F., preferably 100-300° F., preferably 150-200° F. In a related embodiment, the wellbore has a downhole pressure in a range of 100-1,500 psi, preferably 200-1,000 psi, preferably 300-750 psi, preferably 400-600 psi. In some embodiments, the temperature and/or pressure may vary significantly along the wellbore (e.g. a vertical wellbore). In view of the above-mentioned downhole temperatures and pressures, the drilling fluid may preferably operate as intended at high temperature and high pressure (HTHP) conditions.

Interaction of drilling fluids with reservoir rock (e.g. shale rock) can lead to destabilization of the wellbore and formation damage and significant reduction of hydrocarbon production. Major issues involved in utilizing water-based drilling fluids include borehole enlargement and shale sloughing, which severely damage the wellbore formation. Ideally, a drilling fluid formulation should be inactive towards the shale rock in order to preserve the integrity of the wellbore and minimize the invasion of the drilling fluid into the formation. The selection of drilling fluid components is crucial in minimizing the shale dispersion and maximizing the pore plugging in the wellbore formation.

Preferably, the subterranean geological formation is a shale or clay formation, and the drilling fluid used herein effectively inhibits the swelling of shales and clays. It is worth noting that the surfactant of formula (I) and the polyacrylamide present in the drilling fluid synergistically boosts shale swelling inhibition. In one embodiment, the subterranean geological formation is a shale formation, and a degree of shale swelling resulting from the presently disclosed method is 25-60% less than that resulting from a drilling method performed in a substantially similar manner with a substantially similar drilling fluid that is devoid of the surfactant of formula (I) and the polyacrylamide, preferably 30-50% less, preferably 35-40% less than that resulting from a drilling method performed in a substantially similar manner with a substantially similar drilling fluid that is devoid of the surfactant of formula (I) and the polyacrylamide (see FIGS. 9, 10A-10D).

The drilling fluid may be recycled and further recirculated after the circulating. In one embodiment, the drilling fluid is recycled via a filtering/sieving process. For example, after the circulating, large drill cuttings may be removed by passing the drilling fluid through one or more vibrating screens, and fine cuttings may be removed by passing the drilling fluid through centrifuges or screens with small mesh sizes. The recycled drilling fluid may be recirculated into a wellbore.

The drilling fluid disclosed herein may be used during or in conjunction with other operations, such as pre-flush treatments, after-flush treatments, hydraulic fracturing treatments, sand control treatments (e.g., gravel packing), "frac pack" treatments, acidizing treatments (e.g., matrix acidizing or fracture acidizing), wellbore clean-out treatments, cementing operations, workover treatments/fluids, and other operations where the drilling fluid may be useful. In this sense, the drilling fluid may also be considered a fracturing, completion, or workover fluid.

The examples below are intended to further illustrate protocols for preparing, characterizing the drilling fluid, and uses thereof, and are not intended to limit the scope of the claims.

Example 1

Materials

Montmorillonite (Mt) with a pale brown color having a density of 2.5 g/cm$^3$ was obtained from BDH Chemicals (UK). An associative polymer (having hydrophilic and hydrophobic moieties) was purchased from SNF Floerger. Gemini surfactant was synthesized in the laboratory via a synthesis procedure described in previous publications [Hussain, S. S., Kamal, M. S., El Ali, B., and Sultan, A. S., 2017, "Synthesis and evaluation of novel Amido-amine cationic Gemini surfactants containing flexible and rigid spacers," Journal of Surfactants and Detergents, 20(4), pp. 777-788; Hussain, S. S., and Kamal, M. S., 2017, "Effect of large spacer on surface activity, thermal, and rheological properties of novel amido-amine cationic gemini surfactants," Journal of Molecular Liquids; Hussain, S. S., Kamal, M. S., El Ali, B., and Sultan, A. S., 2017, "Synthesis and Evaluation of Novel Amido-Amine Cationic Gemini Surfactants Containing Flexible and Rigid Spacers," Journal of Surfactants and Detergents, 20(4), pp. 777-788; Hussain, S. S., Kamal, M. S., and Sultan, A. S., 2017, "Amido-Amine-Based Cationic Gemini Surfactants: Thermal and Interfacial Properties and Interactions with Cationic Polyacrylamide," Journal of Surfactants and Detergents, 20(1), pp. 47-55; Hussain, S. S., and Kamal, M. S., 2018, "Amido-Amine Based Surfactants: Synthesis, Characterization, and Physico-Chemical Investigation for Enhanced Oil Recovery in Carbonate Reservoirs," AOCS Annual Meeting Minneapolis, USA; and Kamal, M. S., and Hussain, S. S., 2018, "Cationic Polyacrylamide/Cationic Gemini Surfactants Hybrid Material for Enhanced Oil Recovery in Carbonate Reservoirs" AOCS Annual Meeting & ExpoMinneapolis, USA]. Trimethyloctylammonium bromide (purity≥98%) was acquired from Sigma Aldrich.

Example 2

Preparation of Organophilic Clay

Montmorillonite (Mt) was converted to organophilic clay via exchanging interlayer cations with trimethyloctylammonium bromide in an aqueous solution. Specifically, 25 gram of Mt and 8 grams of trimethyloctylammonium bromide was mixed in 500 mL of distilled water. The stirring was applied at room temperature for 24 hours. The clay was filtered and washed several times with water to remove all the unreacted trimethyloctylammonium bromide until no bromide ions were detected by 0.25 M solution of AgNO$_3$. The organophilic clay was vacuum dried at room temperature and ground to fine powder to be used in modified drilling fluid [Zhang, W., Chen, D., Xu, H., Shen, X., and Fang, Y., 2003, "Influence of four different types of organophilic clay on the morphology and thermal properties of polystyrene/clay nanocomposites prepared by using the y-ray irradiation technique," European Polymer Journal, 39(12), pp. 2323-2328].

Example 3

Formulation of Drilling Fluids

The base drilling fluid was prepared by mixing 4 w/v. % Mt in distilled water. The modified drilling fluid was prepared by mixing 4 w/v. % organophilic clay, 0.25 w/v. % associative polymer, and 0.25 w/v. % of Gemini surfactant. Various modified drilling fluids were prepared with different concentrations of Gemini surfactant and 0.25 w/v. % concentration of Gemini surfactant showed the superior properties compared to all other concentrations. A polymer with a similar molecular weight range was used in a concentration of 0.25 w/v. % for the formulation of drilling fluid in our previous study [Ahmad, H. M., Kamal, M. S., and Al-Harthi, M. A., 2018, "High molecular weight copolymers as rheology modifier and fluid loss additive for water-based drilling fluids," Journal of Molecular Liquids, 252, pp. 133-143]. For the current disclosure, various drilling fluids having polymer concentrations ranging from 0.1 to 0.5 w/v. % were formulated and the drilling fluid with 0.25 w/v. % polymer concentration demonstrated superior rheological properties.

Example 4

Measurement of Rheological Properties

The rheological properties of the base and modified drilling fluid were measured using Anton Par Modular Compact Rheometer (MCR 302) at 300 psi pressure, and 100° F., 150° F., and 200° F., respectively.

The steady shear rheology data were fitted to Herschel Bulkley model to obtain yield stress of base and modified drilling fluids [Ahmad, H. M., Kamal, M. S., and Al-Harthi, M. A., 2017, "High molecular weight copolymers as rheology modifier and fluid loss additive for water-based drilling fluids," Journal of Molecular Liquids; and Ahmad, H. M., Kamal, M. S., and Al-Harthi, M. A., 2018, "Rheological and Filtration Properties of Clay-Polymer Systems: Impact of Polymer Structure," Applied Clay Science].

$$\tau = \tau_0 + K(\gamma) \quad \text{Herschel Bulkley model}$$

The steady shear rheology data such as shear stress ($\tau$) and shear rate ($\gamma$) was fitted in to Herschel Bulkley model and model parameters were determined using non-linear regression analysis in the Excel with Solver function.

Gel strength of base and modified drilling fluids were measured at 300 psi pressure, and 100° F., 150° F., and 200°

F., respectively by applying high shear rate 1021 (1/s) followed by a 10 second hold to determine 10-sec gel strength at low shear rate (1/s). Similarly, the high shear rate was applied such as 1021 (1/s) followed by 10 minutes hold to determine 10-min gel strength of drilling fluids at low shear rate (1/s).

Dynamic rheology experiments of drilling fluids were performed at 100° F. and 300 psi pressure to study the storage and loss moduli. Amplitude sweep experiments were performed to determine the linear viscoelastic range of drilling fluid formulations. Frequency sweep experiment was performed by increasing the angular frequency from 1 rad/s to 100 rad/s.

Example 5

Filtration Characteristics of Drilling Fluids

The high temperature/high pressure filtration (HTHP) of the base and modified drilling fluid was performed with OFITE filter press apparatus at 300 psi pressure of nitrogen gas, and 100° F., 150° F., and 200° F., respectively. Filter paper with 2.5 inch diameter was placed at the bottom of the cell and 300 mL of each fluid sample was used for the filtration experiment. The filtration process was carried out over a period of 30 minutes according to the American Petroleum Institute (API) standard. Before starting the filtration experiment, each sample was heated up to the desired temperature and pressure. After the filtration experiment, the filter cake was carefully collected.

Example 6

Characterization of Shale Sample

The XRF and XRD analysis of the shale sample was carried out and results are summarized in Table 1 and Table 2. The digital photograph of shale cuttings is shown in FIG. 1. The studied shale sample was selected from the organic-bearing Qusaiba Shale Formation outcrops at the northwestern area of Saudi Arabia. Qusaiba Shale is widely distributed shale in Saudi Arabia with thickness ranges between 250 m at the outcrop and 1000 m in the subsurface showing a thickening direction toward the east and northeast direction [Al-Laboun, A. A., 1988, "The distribution of Carboniferous-Permian siliciclastic rocks in the greater Arabian basin," Geological Society of America Bulletin, 100(3), pp. 362-373]. Qusaiba Shale is mainly dark to light grey colored, silty, laminated, micaceous, non-calcareous, pyritized, and highly-cemented [Abouelresh, M. O., 2017, "An integrated characterization of the porosity in Qusaiba Shale, Saudi Arabia," Journal of Petroleum Science and Engineering, 149, pp. 75-87, 0920-4105]. In the Saudi stratigraphic section, Qusaiba Shale is well-known as the main rock source for the late Paleozoic reservoirs (Sarah, Unizah, Khuff etc.) [Mahmoud, M., Vaslet, D., and Husseini, M., 1992, "The Lower Silurian Qalibah Formation of Saudi Arabia: An Important Hydrocarbon Source Rock (1)," AAPG Bulletin, 76(10), pp. 1491-1506]. Qusaiba Shale is also the sealing rock for the underline Early Paleozoic reservoirs (Khahfah, Qwuarah etc.) [Birkle, P., 2016, "Geochemical fingerprinting of hydraulic fracturing fluids from Qusaiba Hot Shale and formation water from Paleozoic petroleum systems, Saudi Arabia," Geofluids, 16(3), pp. 565-584]. Accordingly, it can be penetrated during exploration, production, and development of the Paleozoic reservoirs. Recently, Qusaiba Shale has been the major research target for studying unconventional gas resources in Saudi Arabia.

TABLE 1

XRD analysis of shale sample

| TOC % | Total Clays % | Dolomite % | Quartz % | K-spar % | Plag. % | Pyrite % | Q + F % | Carbonates % | Others % | Clays % | Brittleness IDX |
|---|---|---|---|---|---|---|---|---|---|---|---|
| 1.51 | 60 | 2 | 23 | 8 | 3 | 4 | 34 | 2 | 4 | 60 | 25.9 |

TABLE 2

XRF analysis of shale sample

| $SiO_2$ wt % | $TiO_2$ wt % | $Al_2O_3$ wt % | $Fe_2O_3$ wt % | MnO wt % | MgO wt % | CaO wt % | $Na_2O$ wt % | $K_2O$ wt % | $P_2O_5$ wt % | $SO_3$ wt % | Total wt % |
|---|---|---|---|---|---|---|---|---|---|---|---|
| 42.6 | 1.34 | 22.18 | 9.32 | 0.04 | 1.65 | 0.36 | 0.36 | 2.73 | 0.00 | 5.45 | 86.0 |

Example 7

Hot rolling dispersion test of drilling fluid using shale sample Hot rolling dispersion experiment was performed to study the shale recovery performance of base and modified drilling fluid. The shale sample was grinded to 20-30 mesh screen size, and 30 gram of shale sample ($W_0$) was taken for the hot rolling dispersion experiment. Three individual aging cells were used for water, base fluid, and modified fluid along with 30 gram of shale sample. The aging cells were hot-rolled in a rolling oven at 200° F. temperature for 1 hour. After the hot rolling, the shale sample in the base and modified drilling fluids was obtained, and the shale cuttings were sieved with 40-mesh size screen. The shale cuttings left on the 40-mesh size screen were collected and dried at 150° F. and the final weight of shale cuttings (W) was determined. The percentage of shale recovery was measured using the following formula.

% $R=[W/W_0]\times100$

Example 8

Linear Swelling Test of Drilling Fluid Using Shale Sample

The swelling characteristic of shale was assessed using OFITE linear swell meter as a function of time. Shale sample was ground to fine powder and shale pellets were made by pressing the 15 gram of shale powder in the core compactor by applying 6000 psi pressure for 1 hour. Three individual shale pellets were used to study their swelling characteristics with water, base drilling fluid, and modified drilling fluid, respectively. The swelling test was carried out at 200° F. temperature for 20 hours.

Example 9

Results and Discussion

Figure 2:
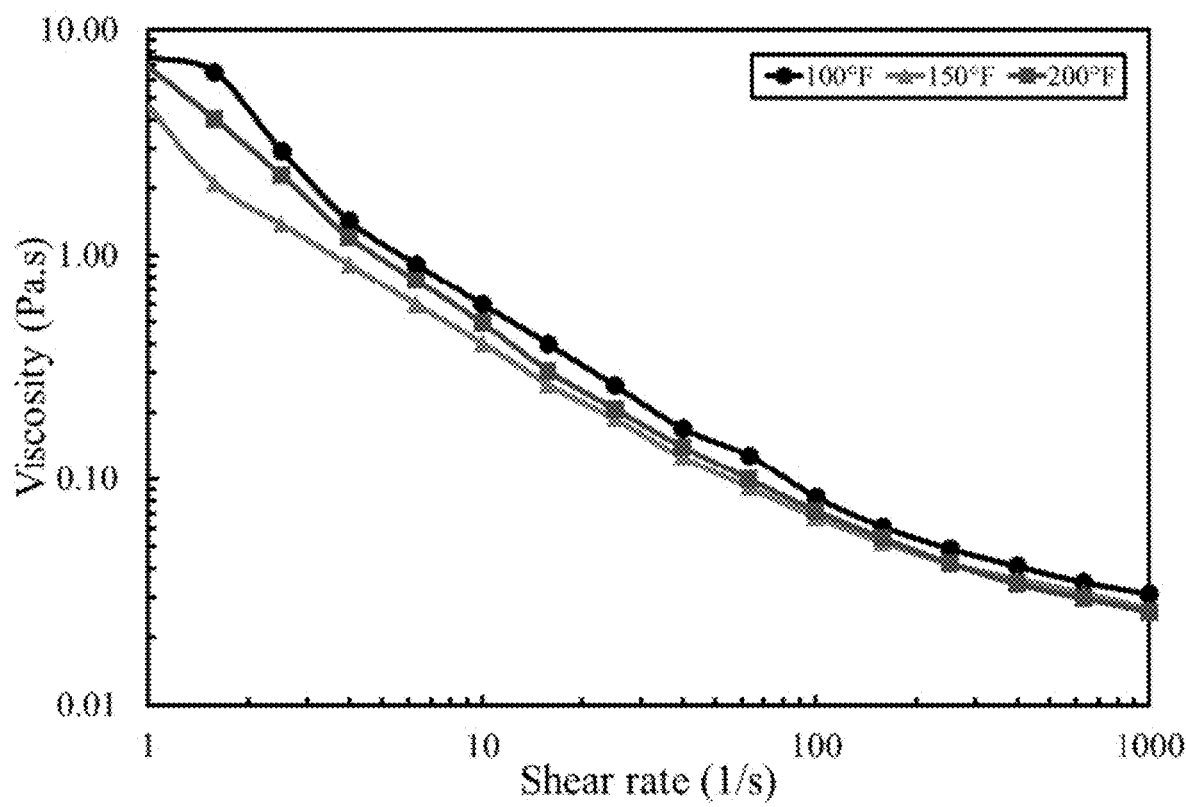
FIG. 2 is an overlay of viscosity profiles of the base drilling fluid (see Example 3 for the formulation) at temperatures of 100° F., 150° F., and 200° F., respectively.

The steady shear viscosity of base drilling fluid at various temperatures is shown in FIG. 2. At all three temperatures, the base drilling fluid showed shear thinning (pseudo-plastic) behavior which indicated that the viscosity of drilling fluid decreased with increasing shear rate. At low shear rates, an increase in temperature from 100° F. to 150° F. slightly decreased the viscosity due to the mobility of base drilling fluid component at higher temperature. Further, increase in temperature from 150° F. to 200° F. slightly increased the viscosity of the base drilling fluid due to the flocculation of clay in the formulation. At higher shear rates, no prominent changes in viscosities were observed for all temperature due to high shear.

Figure 3:
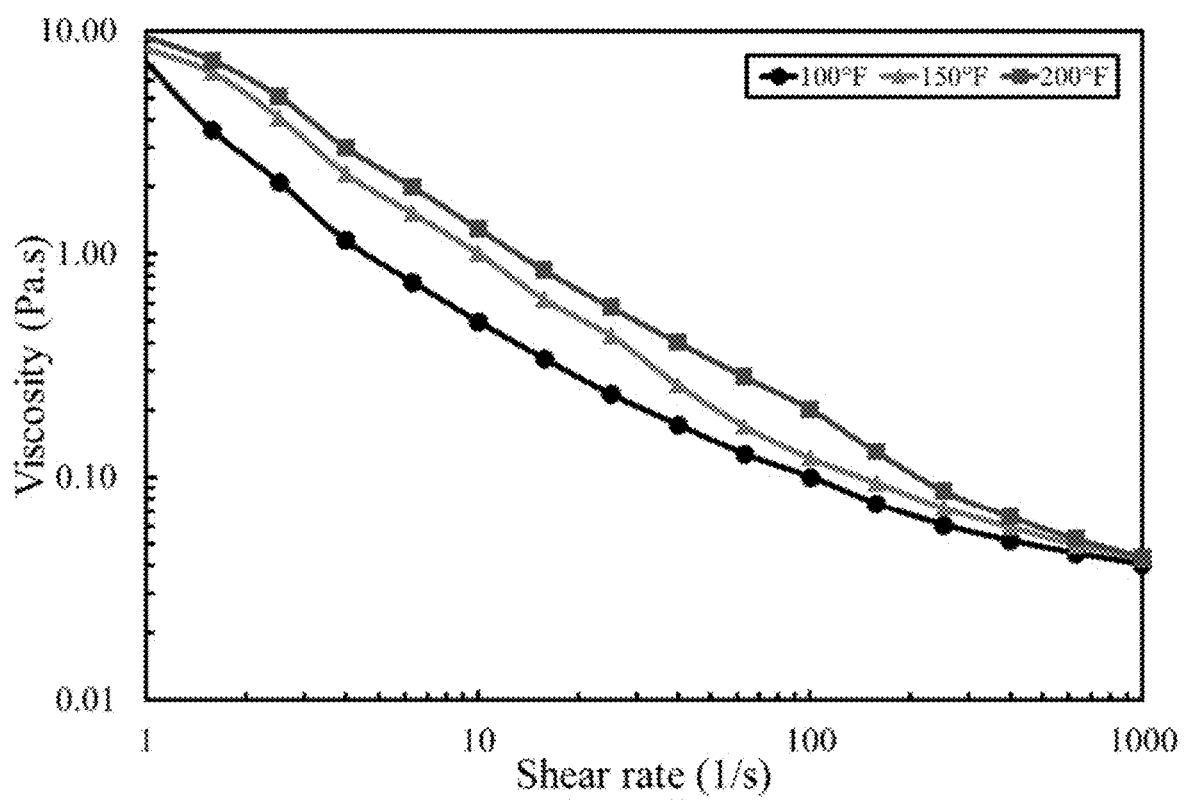
FIG. 3 is an overlay of viscosity profiles of the modified drilling fluid (see Example 3 for the formulation) at temperatures of 100° F., 150° F., and 200° F., respectively.

FIG. 3 shows the steady shear viscosity of the modified drilling fluid (surfactant+polymer) at different temperatures. The modified drilling fluid showed shear thinning (pseudo-plastic) behavior at all temperatures which indicated that increasing the shear rate led to decreasing viscosity of the modified drilling fluid. The viscosity of the modified drilling fluid increased with the addition of the surfactant and associative polymer in the base fluid. At low shear rates, the rise in temperature from 100° F. to 200° F. led to increasing steady shear viscosity of all modified drilling fluids. The increase in viscosity was attributed to the hydrophobic interaction between alkyl end of the surfactant and hydrophobic moieties of the polymer. The associative polymer contains hydrophilic and hydrophobic moieties. The Gemini surfactant contains two tails of hydrophobic groups. The increase in steady shear viscosity of the modified drilling fluid was attributed to the hydrophobic association of alkyl ends of polymer and surfactant.

Figure 4:
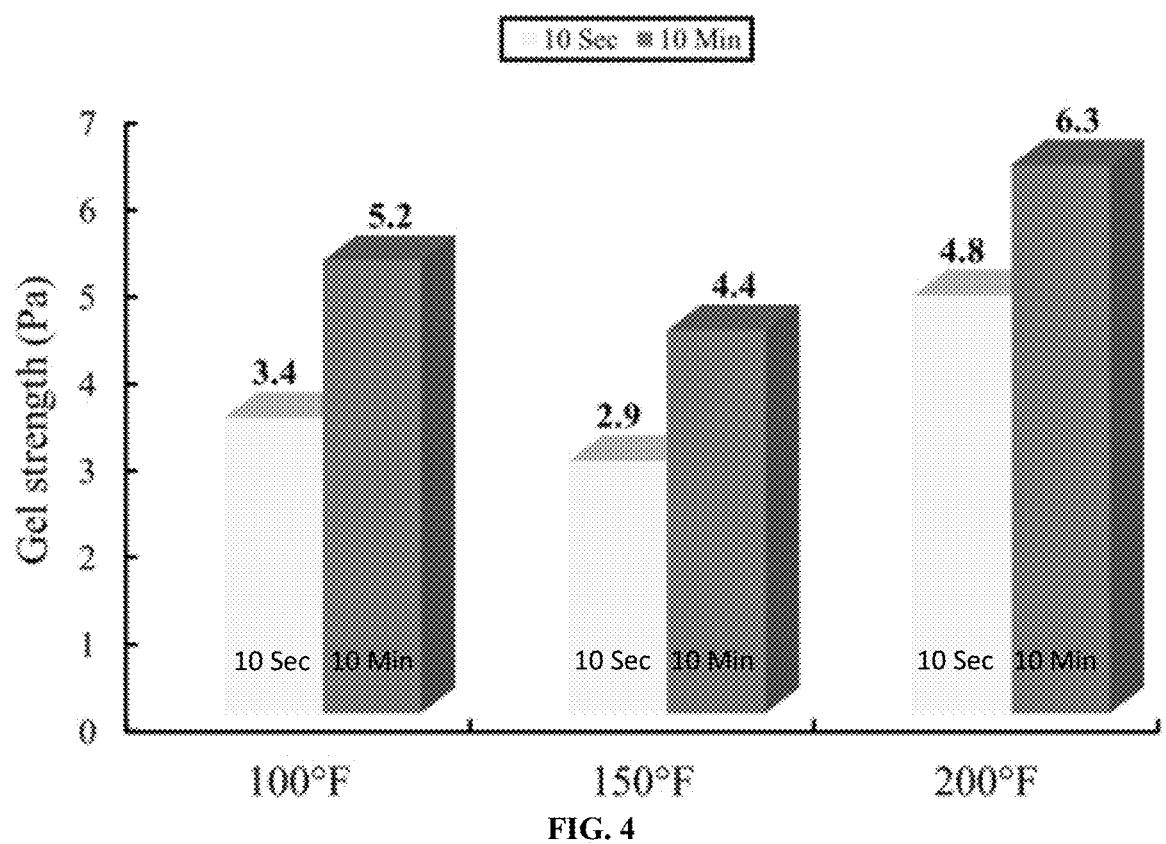
FIG. 4 is a bar graph showing ten-second, and ten-minute gel strengths of the base drilling fluid at temperatures of 100° F., 150° F., and 200° F., respectively.

Gel strength of drilling fluid is one of the prime properties that define the ability of drilling fluid to hold or suspend the drilled cuttings in the well. Gel strength of drilling fluids should be able to keep the drilling operations within the safe limits. Drilling fluid with a high gel strength would require high torque to rotate the drilling bit, while low gel strength would result in the settling of drilled cutting in the wellbore which certainly affects the rate of penetration of drill bit. FIG. 4 shows the gel strength of the base drilling fluid at various temperatures. The rise in temperature from 100° F. to 150° F. led to slightly decreased gel strength of the base drilling fluid due to enhanced Brownian motion in the drilling fluid. However, the increase in temperature from 150° F. to 200° F. resulted in the increase in gel strength due to the flocculation and thermal induced swelling of bentonite at higher temperature [Vryzas, Z., Kelessidis, V. C., Nalbantian, L., Zaspalis, V., Gerogiorgis, D. I., and Wubulikasimu, Y., 2017, "Effect of temperature on the rheological properties of neat aqueous Wyoming sodium bentonite dispersions," Applied Clay Science, 136, pp. 26-36].

Figure 5:
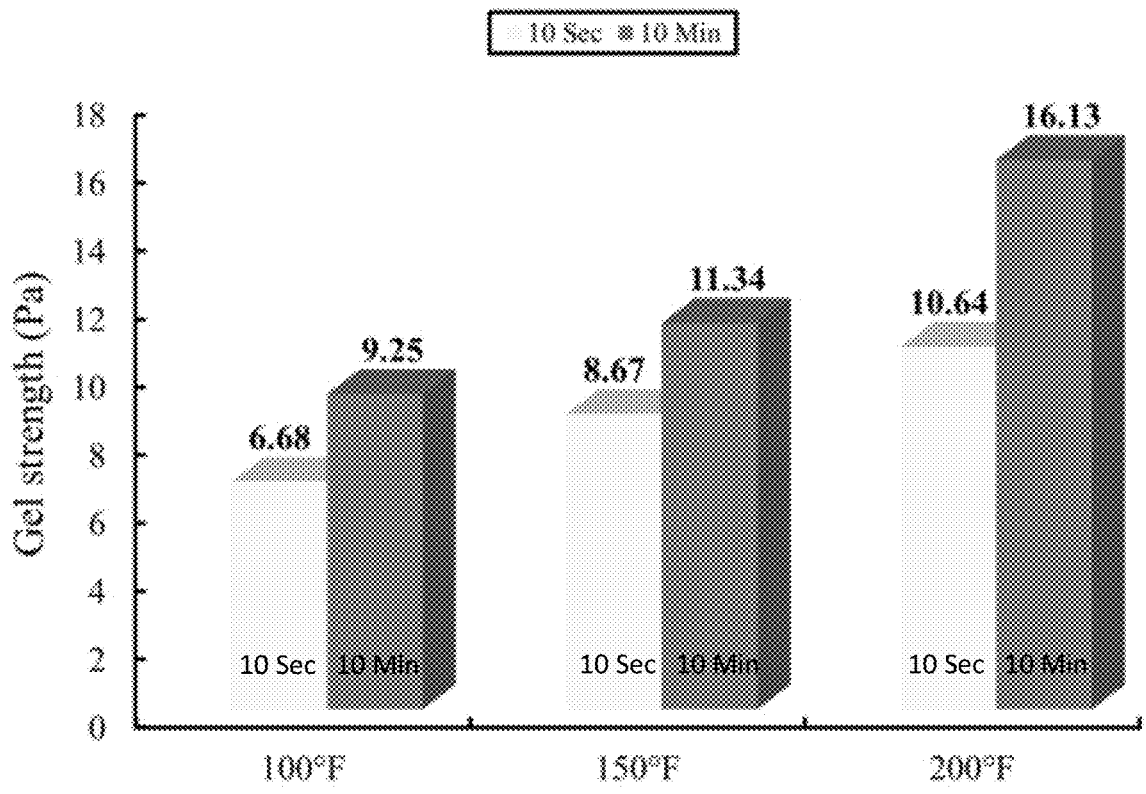
FIG. 5 is a bar graph showing ten-second, and ten-minute gel strengths of the modified drilling fluid at temperatures of 100° F., 150° F., and 200° F., respectively.

FIG. 5 shows the gel strength of the modified drilling fluid at various temperatures and it was observed that with the increase in temperature, gel strength of the modified drilling fluid increased which indicated its capability to suspend the drilling cutting in the wellbore during drilling process. High gel strength is required at high temperature to suspend the drilled-cutting during the connection time of the drill string (during static conditions). The superior gel strength of the modified drilling fluid at higher temperature makes it suitable for high temperature and high pressure drilling operations.

Figure 6:
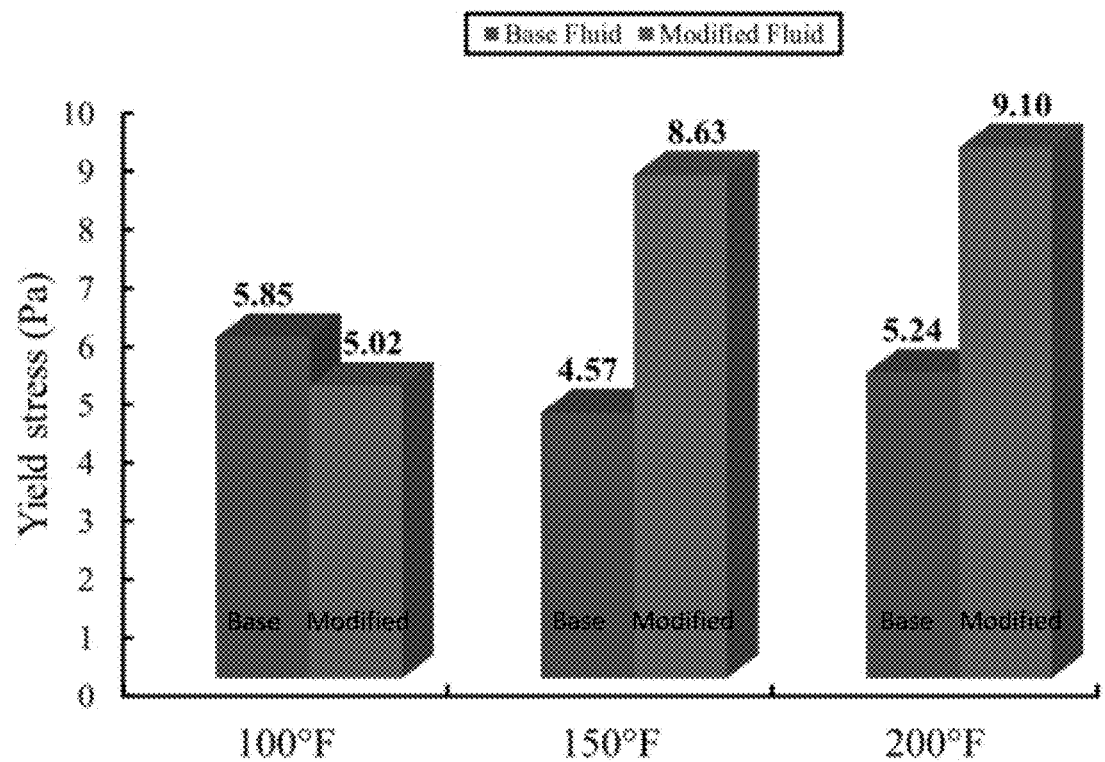
FIG. 6 is a bar graph showing yield stress of the base drilling fluid and the modified drilling fluid at temperatures of 100° F., 150° F., and 200° F., respectively.

FIG. 6 shows the yield stress of the base and modified drilling fluids at different temperatures. Yield stress is one of the crucial properties of water-based drilling fluid which defines the ability to transport the drilled cutting from bottom to the surface and hole cleaning efficiency. The modified drilling fluid showed superior yield stress compared to the base drilling fluid at temperatures of 150° F. and 200° F. At low temperature of 100° F., the modified drilling fluid had a yield stress slightly less than the base fluid. While at higher temperatures such as 150° F. and 200° F., the yield stress of the modified drilling fluid was superior to that of the base fluid due to enhanced adsorption of polymer chains and surfactant moieties onto bentonite platelets. The superior yield stress clearly indicated the suitability of the modified drilling fluid for high temperature applications.

Figure 7:
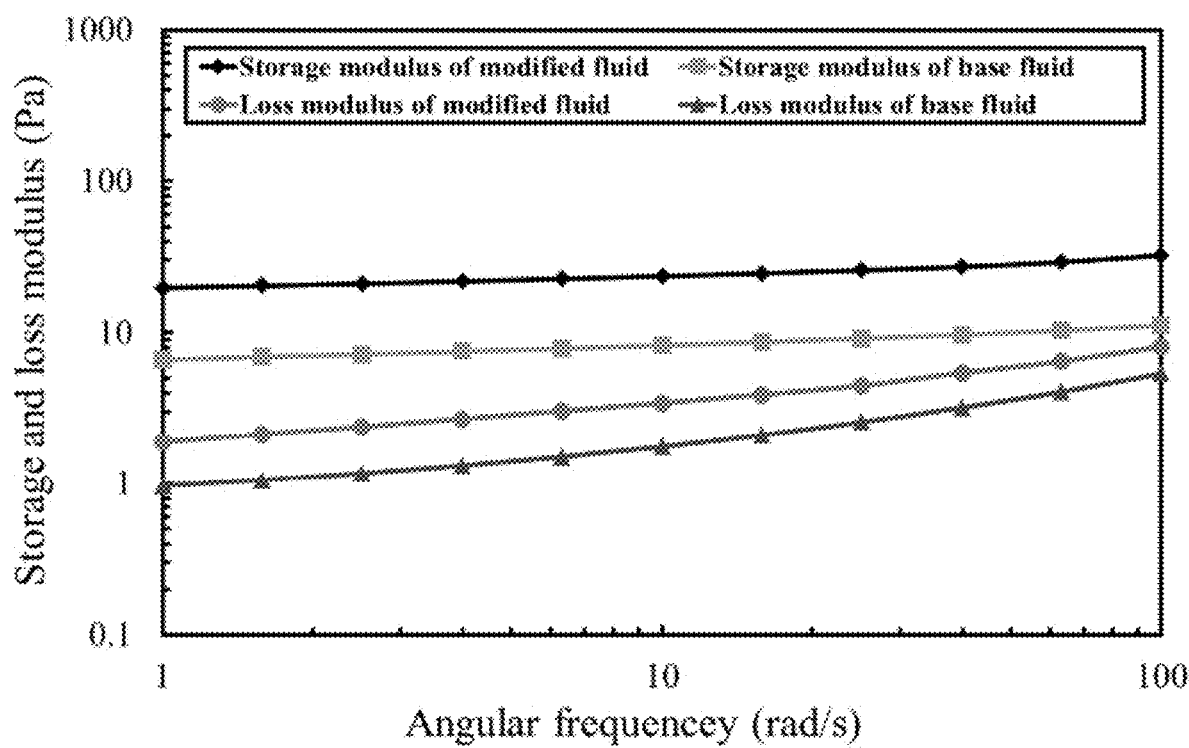
FIG. 7 is an overlay of storage and loss modules of the base drilling fluid and the modified drilling fluid at a temperature of 100° F.

FIG. 7 shows the storage and loss modulus of the base and modified drilling fluids at 100° F. over the angular frequency ranging from 1 rad/s to 100 rad/s. The storage modulus represents the solid or gel-like behavior of drilling fluid, while loss modulus of drilling fluid shows the viscous behavior. The storage and loss modulus of the modified drilling fluid was higher compared to the base drilling fluid, indicating the superior viscoelastic properties of the modified drilling fluid. The storage modulus of both base and modified drilling fluids did not change prominently over the entire range of angular frequency. However, a slight increase in the loss modulus of base and modified drilling fluids was observed with increasing angular frequency. High values of yield point, storage modulus, and loss modulus of the modified drilling fluid are preferable for drilling high temperature formations because of capability of suspending and carrying the drilled cuttings from the downhole to the surface.

Figure 8:
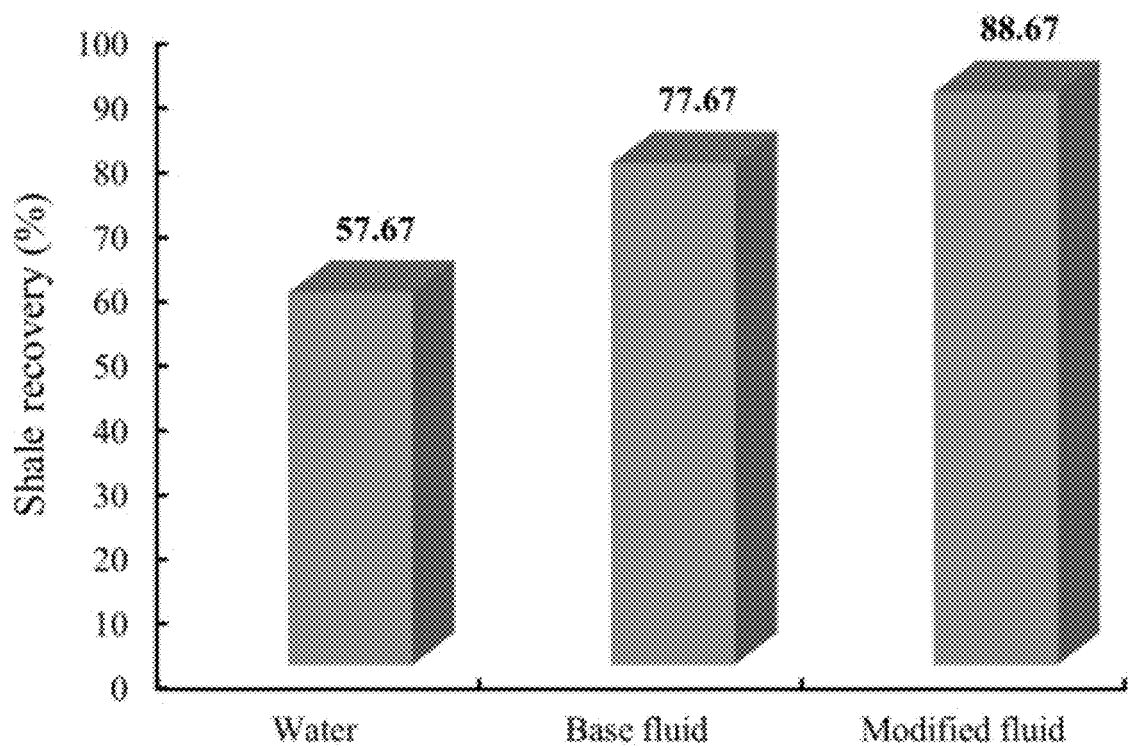
FIG. 8 is a bar graph summarizing shale recovery performance of water, the base drilling fluid, and the modified drilling fluid.

FIG. 8 shows the shale recovery performance of water, base drilling fluid, and modified drilling fluid. Water-based drilling fluids have been widely used for drilling operations to extract oil and gas. Water present in the drilling fluid can react with shale formation and results in swelling and disintegration of shale. The wellbore instability issues are mainly associated with the interaction of drilling fluid with wellbore formations. During the drilling operations, the cuttings of the wellbore are dispersed in the drilling fluid, and drilling fluids with high yield stress is used to transport the drilling cuttings to the surface. The presence of polymer in the drilling fluid usually encapsulates the drilled cuttings and prevents them from further dispersion in the drilling fluid. If the wellbore drilled cuttings disperse and settle down, issues such as pipe stuck or bit balling may occur during the drilling operation.

The present disclosure reveals that the presence of Gemini surfactant and associative polymer in the modified drilling fluid provides superior encapsulating capacity of drilled cuttings compared to the base drilling fluid. In the shale recovery experiment, water was used to study the recovery performance of the shale sample. The results showed only 57.67% recovery of shale sample which indicates the high affinity of shale towards the water. The water molecules migrate to the interlayers of clay minerals in the wellbore formation and result in swelling of clays. The base drilling fluid showed 77.67% recovery of shale sample. The modified drilling fluid showed 88.67% recovery of shale sample, which was superior compared to the water and base drilling fluids. The presence of associative polymer in the modified drilling fluid encapsulated the drilling cuttings and prevented the interaction with shale. Further, the presence of Gemini surfactant plays a vital role in reducing the disintegration of shale cuttings. The Gemini surfactant used herein has two cationic heads which bind itself with the negatively charged clays in the shale. The surfactant also has two long alkyl tail ends which act as a water repellent and prevent the interaction of water with shale cuttings. The high shale recovery of the modified drilling fluid in the presence of associative polymer and Gemini cationic surfactant makes it a suitable candidate as drilling fluid.

Figure 9:
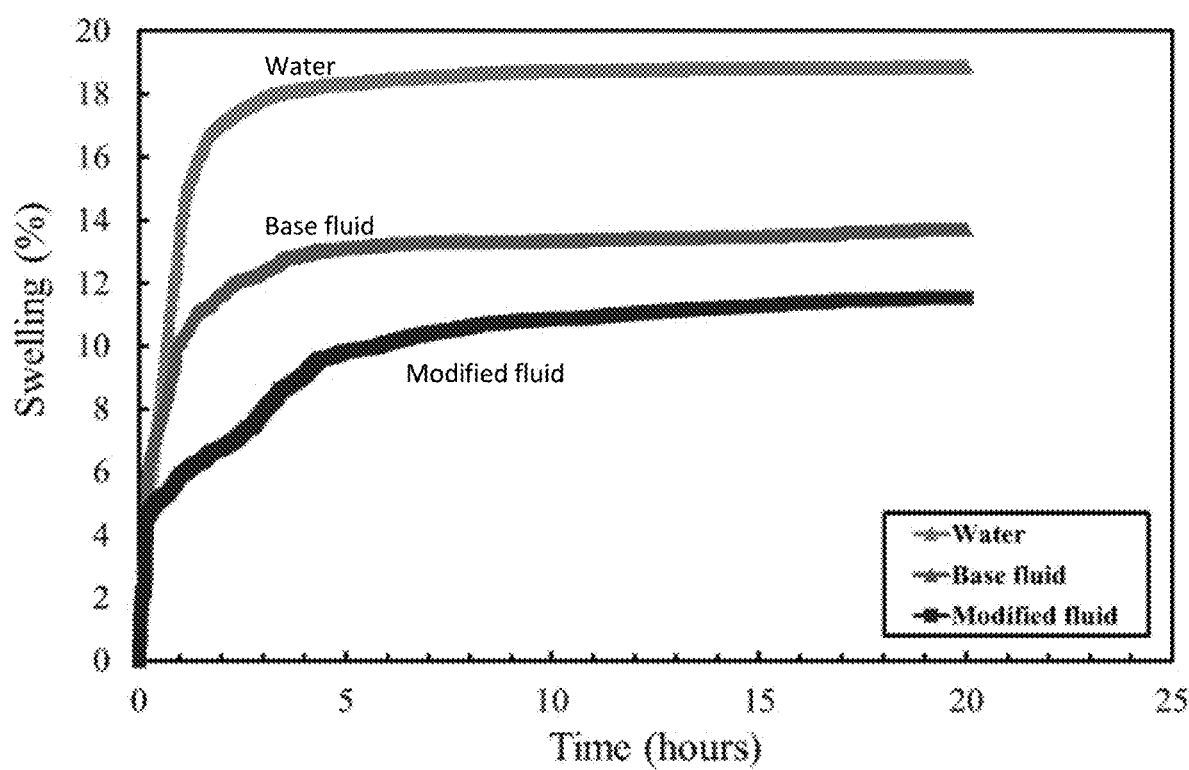
FIG. 9 is an overlay of degrees of swelling of shale pellet over a period of 24 hours using water, the base drilling fluid, and the modified drilling fluid, respectively.
Figure 10A:
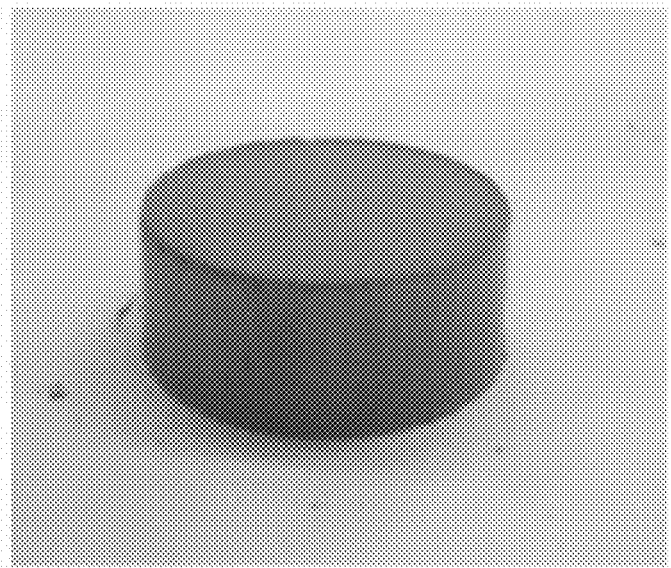
FIG. 10A is a picture of a neat sample of a shale pellet.
Figure 10B:
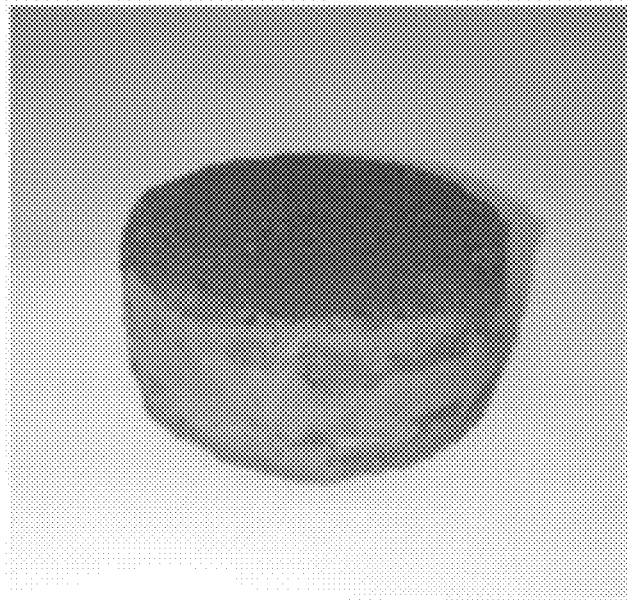
FIG. 10B is a picture of a shale pellet after being immersed in the modified drilling fluid.
Figure 10C:
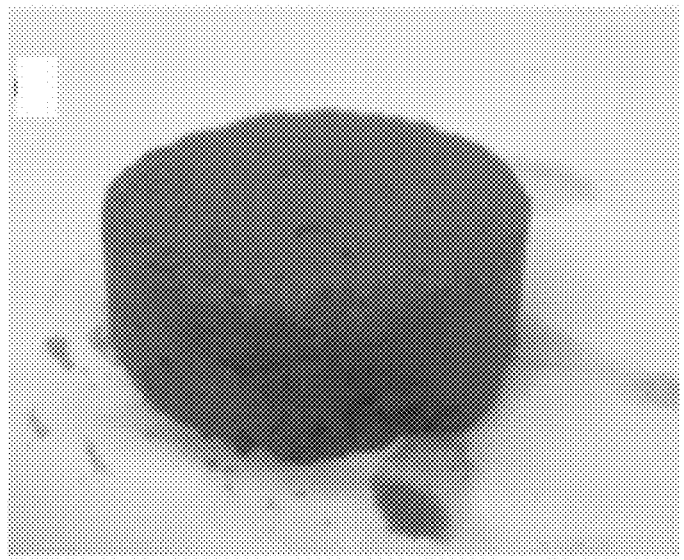
FIG. 10C is a picture of a shale pellet after being immersed in the base drilling fluid.
Figure 10D:
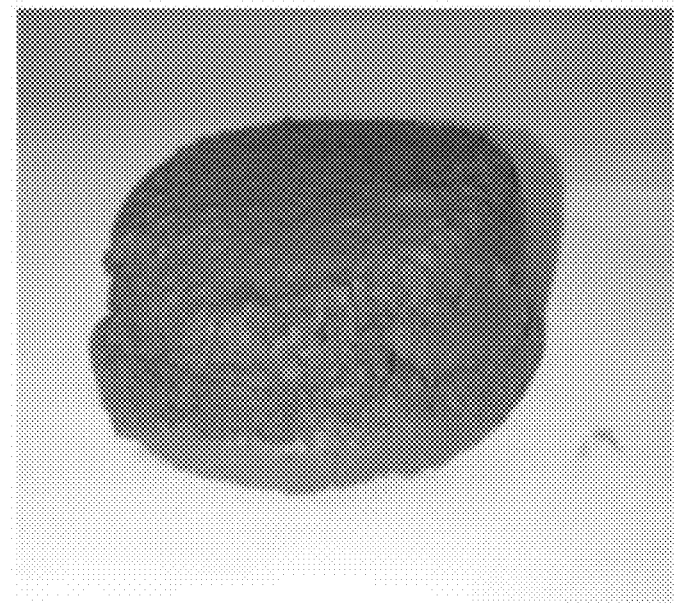
FIG. 10D is a picture of a shale pellet after being immersed in water.

FIG. 9 shows the linear swelling of shale pellets for a period of 20 hours with water, base fluid, and modified drilling fluid. It was observed that water based fluid showed approximately 19% swelling of shale. The maximum swelling with water occurred in the first three hours and after that, no major change in swelling was observed. The base drilling fluid showed approximately 13% swelling of shale pellet. The minimum swelling of shale of approximately 10% was observed for the modified drilling fluid. The presence of associative polymer and Gemini surfactant adsorbed on the shale as a protective layer which further prevents the interaction of water with shale sample. The hydrophobic alkyl groups in the polymer and Gemini surfactant are water repellent and served as encapsulators for shale samples. The modified drilling fluid with a minimum degree of swelling would be a suitable candidate for shale inhibition for troublesome formations.

FIG. 10 shows the shale blocks immersed in water, base fluid, and modified drilling fluid. FIG. 10A shows the near block of shale sample without any crack on its surface with sharp spherical edges. FIG. 10B shows the shale pellet immersed in the modified drilling fluid. A thin protective layer of modified drilling fluid was clearly observed around the shale pellet, which protects it from swelling. FIG. 10C shows the shale pellet immersed in the base drilling fluid. The surface erosion and large cracks on the surface of shale pellet were clearly visible. The presence of cracks on the shale pellets provides paths for water invasion which results in the swelling of shale. FIG. 10D shows the shale pellet immersed in water. The disintegration, cracks, and erosion of the shale sample were visible. The overall results of immersion experiment showed that the modified drilling fluid protected the shale sample and led to minimum swelling of shale.

Figure 11:
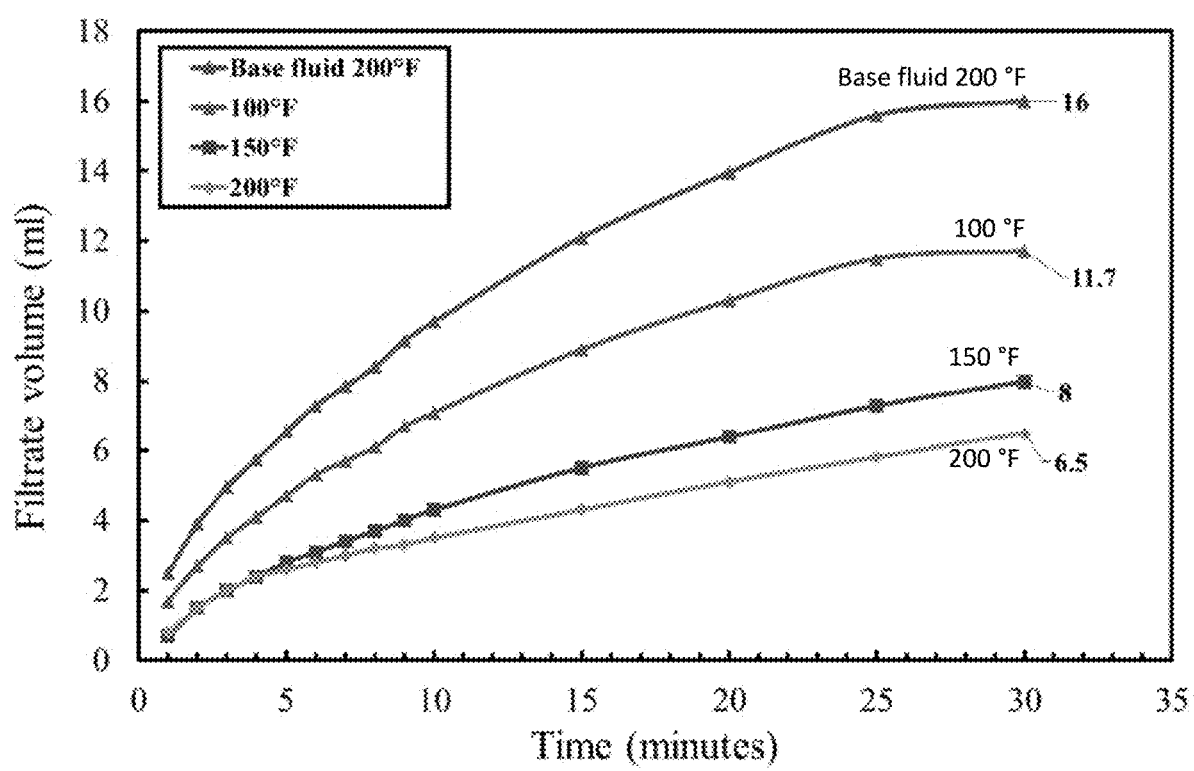
FIG. 11 is an overlay of fluid losses of high temperature high pressure (HTHP) filtration experiment performed on the base drilling fluid at 200° F., and the modified drilling fluid at 100° F., 150° F., and 200° F., respectively.

FIG. 11 shows the high temperature high pressure (HT/HP) filtration experiments of the base and modified drilling fluids at various temperatures. At 300° F., the base drilling fluid showed a maximum fluid loss (16 mL) compared to all other modified drilling fluids. At 100° F., the modified drilling fluid showed 11.7 mL fluid loss. By increasing the temperature from 100° F. to 200° F., the fluid loss of modified drilling fluid decreased to 6.5 mL. The results of fluid loss agreed with rheological properties of modified drilling fluid. The higher rheological properties of drilling fluid resulted in less fluid loss volume. The overall fluid loss of the modified drilling fluid at 200° F. (15 mL) was within the acceptable range of water-based drilling fluid according to the API standards.

Example 10

The high-performance water-based drilling fluid (modified drilling fluid) was prepared using organophilic clay, an associative polymer, and a cationic gemini surfactant synthesized in-house. This gemini surfactant has not been reported in the literature for drilling fluid applications. This is the first investigation on the use of this particular gemini surfactant for water-based drilling fluid application.

Its rheology, fluid loss, and shale inhibition properties were studied at different temperatures. The rheological properties of the modified drilling fluid were studied at 300 psi pressure, and 100° F., 150° F., and 200° F., respectively. The rheological data from rheometer was fitted to the Herschel-Bulkley model to study the rheological properties. The rheological and filtration properties of high-performance drilling fluid was compared with the base drilling fluid (4 w/v. % in distilled water). The modified drilling fluid showed superior rheological properties (viscosity, yield stress, and gel strength) at all temperatures compared to the base drilling fluid. Filtration experiments showed that the modified drilling fluid produced the minimum fluid loss compared to the base drilling fluid, making the former a suitable candidate for HT/HP drilling applications.

Shale sample was analyzed using XRD and XRF analysis to study the chemical composition and mineralogy. The linear swelling experiment of shale sample was analyzed with water, base fluid, and high-performance drilling fluid as a function of time. Hot rolling dispersion experiment was performed at 200° F. to study the encapsulation ability of high-performance drilling fluid and results of shale recovery experiments were compared with water and base drilling fluid. Shale dispersions experiments were carried out with water, base fluid, and modified drilling fluid. The maximum shale recovery (88.67%) was observed with the modified drilling fluid. The linear shale swelling experiments showed that the modified drilling fluid produced only 10% swelling of shale sample which was minimal compared to water and base drilling fluid. The superior rheological, filtration, and shale inhibition properties of the modified drilling fluid would make it suitable candidate for high temperature and high pressure drilling operations.

The invention claimed is:
1. A drilling fluid, comprising:
an aqueous base fluid;
0.2-0.3 wt % of a surfactant of formula (I)

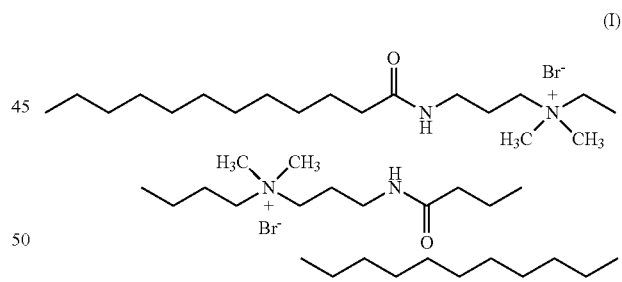

0.2-0.3 wt % of a polyacrylamide with a weight average molecular weight ranging from 320,000 g/mol to 40,000,000 g/mol; and
3-6 wt % of an organophilic clay comprising an ion-exchange reaction product of a smectite clay and a compound of formula (II)

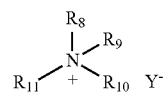

or a salt thereof, a solvate thereof, a stereoisomer thereof, or a mixture thereof, wherein each weight percent is relative to a total weight of the drilling fluid, wherein:

$R_8$ is octyl $R_9$, $R_{10}$, and $R_{11}$ are each methyl; and

Y is a bromide ion.

2. The drilling fluid of claim 1, wherein the smectite clay comprises montmorillonite.

3. The drilling fluid of claim 1, wherein at least 50 mol % of exchangeable cations of the smectite clay are ion exchanged with quaternary ammonium cations from the compound of formula (II).

4. The drilling fluid of claim 1, wherein the polyacrylamide is a copolymer formed by a reaction of an acrylamide monomer, an acrylate monomer, and a hydrophobicity modifying monomer which is at least one selected from the group consisting of N-acrylamidopropyl-N,N-dimethyl-N-dodecyl ammonium chloride, N-methacrylamidopropyl-N,N-dimethyl-N-dodecyl ammonium chloride, N-acrylamidopropyl-N,N-dimethyl-N-dodecyl ammonium bromide, N-methacrylamidopropyl-N,N-dimethyl-N-dodecyl ammonium bromide, N-acrylamidopropyl-N,N-dimethyl-N-octadecyl ammonium chloride, N-methacrylamidopropyl-N,N-dimethyl-N-octadecyl ammonium chloride, N-acrylamidopropyl-N,N-dimethyl-N-octadecyl ammonium bromide, and N-methacrylamidopropyl-N,N-dimethyl-N-octadecyl ammonium bromide, with the proviso that the acrylamide monomer is structurally different from the hydrophobicity modifying monomer.

5. The drilling fluid of claim 4, wherein a molar ratio of the acrylamide monomer to the acrylate monomer is in a range of 3:2 to 4:1, and a molar ratio of the acrylamide monomer to the hydrophobicity modifying monomer is in a range of 200:1 to 800:1.

6. The drilling fluid of claim 1, wherein the polyacrylamide has a weight average molecular weight ranging from 12,000,000 g/mol to 20,000,000 g/mol.

7. The drilling fluid of claim 1, which has a ten-second gel strength of 6.5-13 Pa, and a ten-minute gel strength of 9-20 Pa, at a temperature of 75-250° F.

8. The drilling fluid of claim 1, which has a yield stress of 5-12 Pa at a temperature of 75-250° F.

9. The drilling fluid of claim 1, which has a storage modulus in a range of 20-50 Pa with an angular frequency of 0.1-150 rad/s at a temperature of 75-125° F. and a pressure of 250-600 psi.

10. The drilling fluid of claim 1, consisting of the aqueous base fluid, the surfactant of formula (I), the polyacrylamide; and the organophilic clay.

11. The drilling fluid of claim 1, comprising:
the aqueous base fluid;
about 0.25 wt % of the surfactant of formula (I);
about 0.25 wt % of the polyacrylamide; and
about 4 wt % of the organophilic clay comprising the ion-exchange reaction product of a smectite clay and the compound of formula (II), each relative to a total weight of the drilling fluid.

* * * * *